US012521664B2

(12) United States Patent
Tiffany et al.

(10) Patent No.: US 12,521,664 B2
(45) Date of Patent: Jan. 13, 2026

(54) FILTRATION SYSTEMS WITH SELECTIVE PULSE CONTROL

(71) Applicant: Donaldson Company, Inc., Bloomington, MN (US)

(72) Inventors: Jason A. Tiffany, Bloomington, MN (US); Richard P. DeJong, Eden Prairie, MN (US)

(73) Assignee: Donaldson Company, Inc., Bloomington, MN (US)

( * ) Notice: Subject to any disclaimer, the term of this patent is extended or adjusted under 35 U.S.C. 154(b) by 481 days.

(21) Appl. No.: 17/925,264

(22) PCT Filed: May 14, 2021

(86) PCT No.: PCT/US2021/032504
§ 371 (c)(1),
(2) Date: Nov. 14, 2022

(87) PCT Pub. No.: WO2021/231897
PCT Pub. Date: Nov. 18, 2021

(65) Prior Publication Data
US 2023/0219029 A1 Jul. 13, 2023

Related U.S. Application Data

(60) Provisional application No. 63/025,698, filed on May 15, 2020.

(51) Int. Cl.
*B01D 46/46* (2006.01)
*B01D 46/42* (2006.01)
(Continued)

(52) U.S. Cl.
CPC ......... *B01D 46/46* (2013.01); *B01D 46/4272* (2013.01); *B01D 46/429* (2013.01);
(Continued)

(58) Field of Classification Search
CPC ...... B01D 46/71; B01D 46/715; B01D 46/72; B01D 46/46; B01D 46/762; B01D 46/446;
(Continued)

(56) References Cited

U.S. PATENT DOCUMENTS 3,932,152 A * 1/1976 Rotondi ................ B01D 46/04
55/302
4,738,696 A * 4/1988 Staffeld .............. B01D 46/4281
95/286
(Continued)

FOREIGN PATENT DOCUMENTS

CN 208340343 1/2019
EP 0573209 A1 * 12/1993
(Continued)

OTHER PUBLICATIONS

"International Preliminary Report on Patentability," for PCT Application No. PCT/US2021/032504 mailed Nov. 24, 2022 (14 pages).
(Continued)

*Primary Examiner* — Robert Clemente
(74) *Attorney, Agent, or Firm* — Pauly, DeVries Smith & Deffner LLC

(57) ABSTRACT

Embodiments herein relate to filtration systems that can pulse clean filter elements selectively, in specific patterns, to enhance cleaning efficacy. In an embodiment, a filtration system is included having a plurality of filter element mounts configured to retain filter elements, a compressed gas supply, and a plurality of valves in fluid communication with the compressed gas supply. The system further including a control circuit configured to control actuation of the plurality of valves. The system can operate in a first mode and a second mode. Wherein operating in a first mode includes opening valves according to a first valve actuation pattern and operating in a second mode includes opening
(Continued)

valves according to a second valve actuation pattern. The system can be configured to periodically switch from the first mode to the second mode and compare the efficacy of the two modes. Other embodiments are also included herein.

19 Claims, 18 Drawing Sheets

(51) Int. Cl.
  *B01D 46/44* (2006.01)
  *B01D 46/71* (2022.01)
  *B01D 46/762* (2022.01)
(52) U.S. Cl.
  CPC ......... *B01D 46/446* (2013.01); *B01D 46/448* (2013.01); *B01D 46/71* (2022.01); *B01D 46/762* (2022.01); *B01D 2279/60* (2013.01)
(58) Field of Classification Search
  CPC .. B01D 46/448; B01D 2279/60; B01D 46/04; B01D 46/58
  See application file for complete search history.

(56) References Cited

U.S. PATENT DOCUMENTS

| | | | | |
|---|---|---|---|---|
| 5,062,867 | A | * | 11/1991 | Klimczak ............. B01D 46/04 95/280 |
| 5,116,395 | A | | 5/1992 | Williams |
| 5,575,826 | A | | 11/1996 | Gillingham et al. |
| 6,077,490 | A | | 6/2000 | McIlroy et al. |
| 6,149,716 | A | | 11/2000 | Bach et al. |
| 9,782,711 | B2 | | 10/2017 | Barker |
| 2009/0114095 | A1 | * | 5/2009 | Hanson ................ B01D 46/521 96/142 |
| 2009/0272082 | A1 | * | 11/2009 | Nahey ................... B01D 46/72 55/294 |
| 2011/0023709 | A1 | | 2/2011 | Bosshard |
| 2013/0255485 | A1 | | 10/2013 | Appelo et al. |
| 2015/0202558 | A1 | | 7/2015 | Barker |
| 2019/0209957 | A1 | | 7/2019 | Silvestro |

FOREIGN PATENT DOCUMENTS

| | | |
|---|---|---|
| EP | 0525417 | 9/1995 |
| EP | 0796645 | 9/1997 |
| EP | 2830735 | 2/2015 |
| EP | 2602016 | 6/2017 |
| KR | 20150037186 | 4/2015 |
| NZ | 503915 | 9/2001 |
| WO | WO-8707179 A1 * | 12/1987 |
| WO | 9740912 | 11/1997 |
| WO | 2007041955 | 4/2007 |
| WO | 2013144843 | 3/2013 |
| WO | 2021231897 | 11/2021 |

OTHER PUBLICATIONS

"International Search Report and Written Opinion," for PCT Application No. PCT/US2021/032504 mailed Sep. 10, 2021 (21 pages).
"Invitation to Pay Additional Fees," for PCT Application No. PCT/US2021/032504 mailed Jul. 19, 2021 (16 pages).
"First Office Action," for Saudi Arabian Patent Application No. 522441333 mailed Feb. 13, 2025 (9 pages).
"Communication pursuant to Article 94(3) EPC," for European Patent Application No. 21731340.2 mailed Jan. 15, 2024, 7 pages.
"First Office Action," for United Arab Emirates Patent Application No. P6002360/22 mailed Nov. 26, 2024, 9 pages.

* cited by examiner

FILTRATION SYSTEMS WITH SELECTIVE PULSE CONTROL

This application is being filed as a PCT International Patent application on May 13, 2021 in the name of Donaldson Company, Inc., a U.S. national corporation, applicant for the designation of all countries and Jason A. Tiffany, a U.S. Citizen, and Richard P. DeJong, a U.S. Citizen, inventors for the designation of all countries, and claims priority to U.S. Provisional Patent Application No. 63/025,698, filed May 15, 2020, the contents of which are herein incorporated by reference in its/their entirety/entireties.

FIELD

Embodiments herein relate to filtration systems that pulse clean filter elements. More specifically, embodiments herein relate to filtration systems that can pulse clean filter elements selectively, in specific patterns, to enhance cleaning efficacy.

BACKGROUND

Systems for filtering an air or gas stream laden with particulate matter include air filter assemblies that have filter elements disposed in a housing. The filter element may be a cartridge, bag or sock of a suitable fabric or pleated paper.

The accumulation of particulate materials on the filters can result in additional resistance to airflow going through the filtration system and a typically gradual increase in differential pressure drop. Therefore, differential pressure can be used to determine the relative condition of the filters as the dust builds up on the filters and can be used as an indicator of when cleaning of the filters is needed.

A typical cleaning system for the filter elements within dust collectors uses compressed air. The cleaning system includes an air manifold mounted on the collector connected to a compressed supply. Attached to the manifold are diaphragm valves that have tubes (blowpipes) that go into the collector and are lined up with each filter set.

When the valves are actuated, a pulse of air flows through the diaphragm valves and into the interior of the filter element resulting in a retrograde pressure wave that can be sufficient to clean the filter element by dislodging particulate matter thereon. Cleaning of the filter element in this manner can cause the differential pressure to be lowered (pressure drop recovery) until further particular matter accumulates on the filter element.

SUMMARY

Embodiments herein relate to filtration systems that can pulse clean filter elements selectively, in specific patterns, to enhance cleaning efficacy. In an embodiment, a filtration system is included having a plurality of filter element mounts configured to retain filter elements, a compressed gas supply, and a plurality of valves in fluid communication with the compressed gas supply. The system further including a control circuit configured to control actuation of the plurality of valves. The system can operate in a first mode and a second mode. Wherein operating in a first mode includes opening valves according to a first valve actuation pattern and operating in a second mode includes opening valves according to a second valve actuation pattern. The system can be configured to periodically switch from the first mode to the second mode and compare the efficacy of the two modes. In an embodiment, the first mode represents a default operating mode.

In an embodiment, the control circuit selects the second valve actuation pattern of the second mode from amongst a set of preconfigured valve actuation patterns. In an embodiment, the control circuit selects the second valve actuation pattern of the second mode based on factors including temporal factors. In an embodiment, the control circuit selects the second valve actuation pattern of the second mode based on a pattern matching algorithm.

In an embodiment, the control circuit is configured to generate new valve actuation patterns by modifying parameters of existing valve actuation patterns. In an embodiment, the control circuit is configured to store generated valve actuation patterns as a part of a set of preconfigured valve actuation patterns.

In an embodiment, the control circuit receives the second valve actuation pattern from a remote site. In an embodiment, the filtration system receives one or more valve actuation patterns from a remote site.

In an embodiment, opening the plurality of valves results in a pulse of a gas directed at the filter element. In an embodiment, the plurality of valves are arrayed in a grid pattern.

In an embodiment, the efficacy is assessed based on a magnitude of a change in pressure drop in the filtration system achieved resulting from execution of a valve actuation pattern. In an embodiment, the efficacy is assessed based on a magnitude of pressure drop recovery in the filtration system achieved resulting from execution of a valve actuation pattern.

In an embodiment, the efficacy is assessed based on a magnitude of sustained pressure drop recovery in the filtration system achieved resulting from execution of a valve actuation pattern.

In an embodiment, the efficacy is assessed based on a magnitude of a change in velocity across a filter element achieved resulting from execution of a valve actuation pattern.

In an embodiment, the control circuit adopts the second mode as a new default mode if the efficacy of the second mode is better than the efficacy of the first mode.

In an embodiment, the second valve actuation pattern is different than the first valve actuation pattern in at least one operational parameter. In an embodiment, the operational parameters are selected from the group consisting of a horizontal actuation sequence, a vertical actuation sequence, a zone actuation sequence, a linked group actuation sequence, a valve opening time, an amount of time between sequential valve actuations, and a threshold pressure drop for triggering valve actuation.

In an embodiment, the control circuit is configured to trigger actuation of at least one other treatment in combination with valve actuation patterns. In an embodiment, the other treatment include sonic excitation.

In an embodiment, a filtration system is included having a plurality of filter element mounts, wherein the plurality of filter element mounts are configured to retain filter elements. The system also includes a compressed gas supply and a plurality of valves, wherein the plurality of valves are in fluid communication with the compressed gas supply, wherein opening the plurality of valves results in a pulse of a gas directed at the filter element. The system also includes a control circuit, wherein the control circuit is configured to control actuation of the plurality of valves and select a valve actuation pattern and execute the same such that valves are actuated in a sequence according the determined valve actuation pattern.

In an embodiment, the control circuit is configured to select a valve actuation pattern by selecting a valve actuation pattern from a set of predetermined valve actuation patterns.

In an embodiment, wherein the control circuit is configured to select a valve actuation pattern based on a set of criteria including current weather and environmental conditions. In an embodiment, current weather and environmental conditions include snowstorms, sandstorms, pollen loads, and plant debris. In an embodiment, the control circuit is configured to select a valve actuation pattern based on current or anticipated icing conditions. In an embodiment, the control circuit is configured to select a valve actuation pattern based on a set of criteria including current temperature and humidity.

In an embodiment, the control circuit is configured to select a valve actuation pattern based on a set of criteria including data regarding particulates flowing into the filtration system. In an embodiment, the data regarding particulates flowing into the filtration system is sensor-based, sampling based, or user-input based.

In an embodiment, wherein the plurality of valves are arrayed in a grid pattern.

In an embodiment, wherein the filtration system is part of an industrial dust collector. In an embodiment, wherein the filtration system is of part of a gas turbine power generation system.

In an embodiment, a method of operating a filtration system is included, the method including sensing data including at least one of temperature, humidity, and particulate types entering the filtration system. The method can also include selecting a valve actuation pattern, the valve actuation pattern including a sequence of valves to be opened. The method can also include opening valves from amongst a plurality of valves according to the determined valve actuation pattern.

In an embodiment, selecting the valve actuation pattern includes selecting the valve actuation pattern from a set of predetermined valve actuation patterns.

In an embodiment, at least some valve actuation patterns in the set of predetermined valve actuation patterns are received from a remote source. In an embodiment, at least some valve actuation patterns in the set of predetermined valve actuation patterns are generated by a recombination of valve actuation parameters.

In an embodiment, selecting the valve actuation pattern includes selecting the valve actuation pattern based on a set of criteria including current weather conditions. In an embodiment, selecting the valve actuation pattern includes selecting the valve actuation pattern based on a set of criteria including current temperature and humidity. In an embodiment, selecting the valve actuation pattern includes selecting the valve actuation pattern based on a set of criteria including data regarding particulates flowing into the filtration system.

In an embodiment, a method can further include periodically switching to an exploratory valve actuation pattern and comparing an efficacy of the selected valve actuation pattern and an efficacy of the exploratory valve actuation pattern.

In an embodiment, the method can further include continuing use of the exploratory valve actuation pattern if its efficacy is higher than the selected valve actuation pattern. In an embodiment, the recombination is randomly generated. In an embodiment, wherein the recombination is generated using a machine learning algorithm.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

Figure 1:
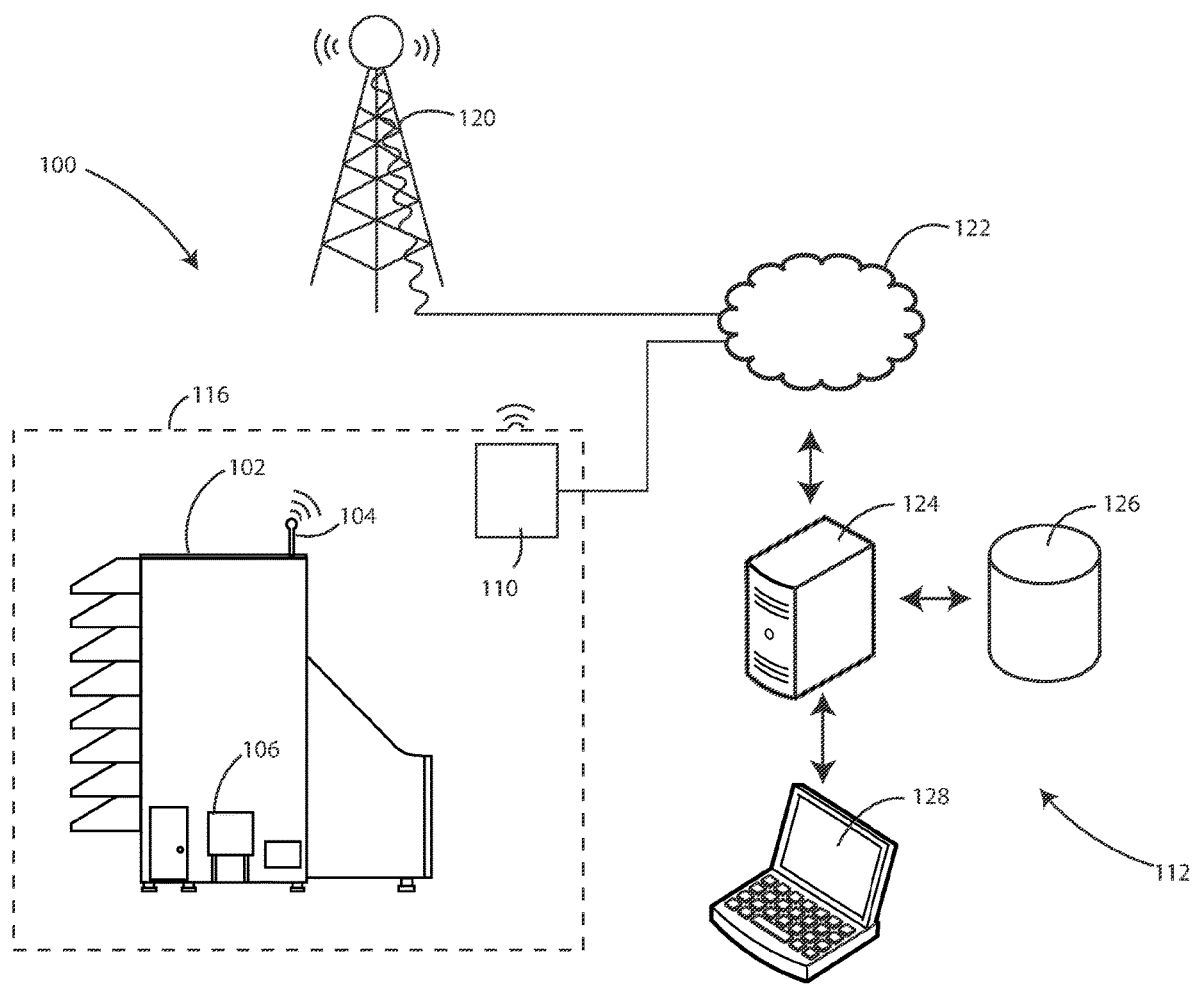
FIG. 1 is a schematic view of a filtration system data communication environment in accordance with various embodiments herein.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

As referenced above, a typical cleaning system for filter elements within a filtration system uses compressed air. The cleaning system typically includes an air manifold connected to a compressed supply. Attached to the manifold are diaphragm valves that have tubes (such as blowpipes) that are lined up with the filter elements.

When the valves are actuated, a pulse of air flows through the diaphragm valves and into the interior of the filter element resulting in a retrograde pressure wave that can be sufficient to clean the filter element by dislodging particulate matter thereon. Cleaning of the filter element in this manner can cause the differential pressure to be lowered (pressure drop recovery) until further particulate matter accumulates on the filter element.

However, air filtration systems may include many filter elements. It has been found that the specific sequence or pattern of pulses of air for filter elements within a system can result in differences in the pressure drop recovery and efficiency of use of compressed air to achieve the same. For example, pulsing filter elements according to one particular pattern may offer benefits over pulsing filter elements according to another pattern. As such, embodiments herein can include systems that intelligently utilize different valve actuation patterns (pulsing patterns) in order to enhance the process of filter element cleaning as reflected in pressure drop recovery and increased efficiency of compressed air usage.

The best pattern for pulsing filter elements can be something that may vary based on current conditions. For example, while a given pattern may be ideal under one set of conditions (temperature, humidity, precipitation, type of particulate matter, amount of particulate matter in the air, etc.), another pattern may be better when conditions change. In accordance, with embodiments herein, systems can periodically test different valve actuation patterns to determine the comparative efficacy of the same and, if a better valve actuation pattern is found, switch to the ongoing use of the valve actuation pattern empirically demonstrated to be better.

In various embodiments, the system can also store data (in a database or other data storage facility) regarding which patterns were found to be the best along with data regarding the prevailing conditions at that time. In some embodiments, the system can periodically execute a pattern matching operation (using a least squares approach, a statistical approach, a machine learning approach, or the like) to select/identify the valve actuation pattern that worked the best under conditions that most closely match the current conditions.

In some embodiments, data regarding valve actuation patterns efficacy under certain conditions can be shared, such as by being communicated to a network which can store such information and which can provide information regarding valve actuation patterns to other systems.

It will be appreciated that embodiments herein can be used in combination with many different types of filtration systems. Some of these filtration systems may be networked and form part of a filtration system network, while others are not networked. Referring now to FIG. 1, a schematic view of a filtration system network 100 is shown by way of example. A filtration system 102, such as a filtration system for a gas turbine or a manufacturing environment, can be part of the filtration system network 100 and can include a communication unit 104 and a control unit 106 or control system. The communication unit 104 can include a communication circuit, amongst other things. The control unit 106 can include a control circuit, amongst other things.

The filtration system 102 can be used for various purposes in outdoor or indoor settings including, but not limited to, filtering outdoor air for gas turbines or air within manufacturing environments. Exemplary filtration systems are described in greater detail below.

In various embodiments, the filtration system 102 stores one or more valve actuation patterns. In various embodiments, the filtration system 102 receives one or more valve actuation patterns from a remote site. In various embodiments, the filtration system 102 receives one or more valve actuation patterns as input from a system user In various embodiments, the filtration system 102 generates one or more valve actuation patterns. In various embodiments, components at a remote site generate one or more valve actuation patterns.

In various embodiments, the filtration system 102 selects one or more valve actuation patterns for use. In various embodiments, the filtration system 102 compares the efficacy of one or more valve actuation patterns against other valve actuation patterns.

In some embodiments, the filtration system 102 can be within a work environment 116. The work environment 116 can represent a geographic area in which the filtration system 102 primarily operates. In other embodiments, the work environment 116 can represent a building in which the filtration system 102 is located within. Depending on the nature of the filtration system 102, the work environment 116 can be quite large (10s to 1000s of square miles) or relatively small (100s to 1000s square feet).

In some embodiments, the work environment 116 can be, for example, a gas turbine facility, a manufacturing facility, a production facility, or the like. In some embodiments, a gateway or repeater unit 110 can be disposed within the work environment 116. The gateway or repeater unit 110 can, in some embodiments, communicate wirelessly with the filtration system 102 and/or components thereof such as the communication unit 104 and/or the control unit 106. In some embodiments, the gateway or repeater unit 110 can be connected to an external data network 122, such as the Internet or various private data networks.

The control unit 106 can include a local control circuit, such as a control circuit that is located within or in close proximity to the filtration system 102. In various embodiments, the communication circuit can be in electrical communication with the local control circuit.

The filtration system 102 can also include a communication circuit as mentioned above. The communication circuit can be in electrical communication (wired or wirelessly) with the local control circuit. In some embodiments, the data communication environment can further include a remote-control and/or monitoring system 112 in communication with the filtration system 102 remotely through the data network 122. The remote-control system 112 can include a server 124 (real or virtual), a database 126 (real or virtual), and, in some embodiments, a user device 128. In some embodiments, "remote" can refer to a component that is external to the filtration system 102. In some embodiments, "remote" can refer to a component that is outside of the work environment 116.

The control unit 106 and/or the filtration system 102 can be configured to send signals and/or data to the remote-control system 112. The remote-control system 112 can be configured to send data and/or instructions to the control unit 106 and/or the filtration system 102. In some embodiments, the remote-control system 112 can be configured to generate and/or send valve actuation patterns.

In some embodiments, the data network 122 can be a packet-switched network. In some embodiments, the gateway or repeater unit 110 can also include data network router functionality. In various embodiments, the remote-control system 112, the control unit 106, or the communication unit 104 can send or receive data or instructions to/from an application programming interface (API), such as a weather API. The weather API can be used to provide information about current weather conditions as well as future predicted weather conditions.

It will be appreciated that weather APIs are available from a number of service providers including, but not limited to, Yahoo Weather, Open WeatherMap, AccuWeather, Dark Sky, and the National Weather Service, amongst others. In some embodiments, the weather API can send information regarding past, present, or future weather conditions for the work environment 116, an area served by the filtration system 102, or an area served by a system in which the filtration system 102 is part of. In various embodiments, the API can be connected to the data network 122 to communicate with other portions of the network.

In various embodiments, interface with the API can follow a SOAP or REST based architecture and can include communications in a JSON, XML, or YAML format, a derivative format based on one of these, or another data format. Communications with the API can include a request including one or more of a URL, method, headers, and a body. API responses can include one or more of status codes, headers, and a body.

In some embodiments, wireless signals from one or more of the components such as the filtration system 102, communication unit 104, control unit 106, gateway or repeater unit 110, can be exchanged with a wireless communication tower 120 (or antenna array), which could be a cellular tower or other wireless communication tower. The wireless communication tower 120 can be connected to a data network 122, such as the Internet or another type of public or private data network, packet-switched or otherwise.

The data network 122 can provide for one-way or two-way communication with other components that are external to or remote from the work environment 116. For example, a server 124 or other processing device can receive electronic signals containing data from or send electronic signals containing data to one or more components such as the filtration system 102, communication unit 104, control unit 106, gateway or repeater unit 110, or the like. The server 124 can interface with a database 126 to store data. In some embodiments, the server 124 (or a particular device that is part of the server system) can interface with a user device 128, which can allow a user to query data stored in the database 126.

Data produced and/or stored by the filtration system 102 can be of various types. In some embodiments, data produced and/or stored by the filtration system 102 can include data regarding pressure drop, valve actuation patterns, efficacy of a particular valve actuation pattern, pressure drop change over time, filter removal events and/or counts of same, valve actuation pattern change events, filter hours of usage, filter installation dates and times and/or counts of installation events, and the like.

Filtration systems herein can take on many different forms and can be those suitable for many different applications. The filtration system 102 can be a standalone unit or can be a part of various pieces of equipment. In various embodiments, the filtration system 102 is part of an industrial dust collector. In various embodiments, the filtration system 102 is part of a gas turbine power generation system.

Figure 2:
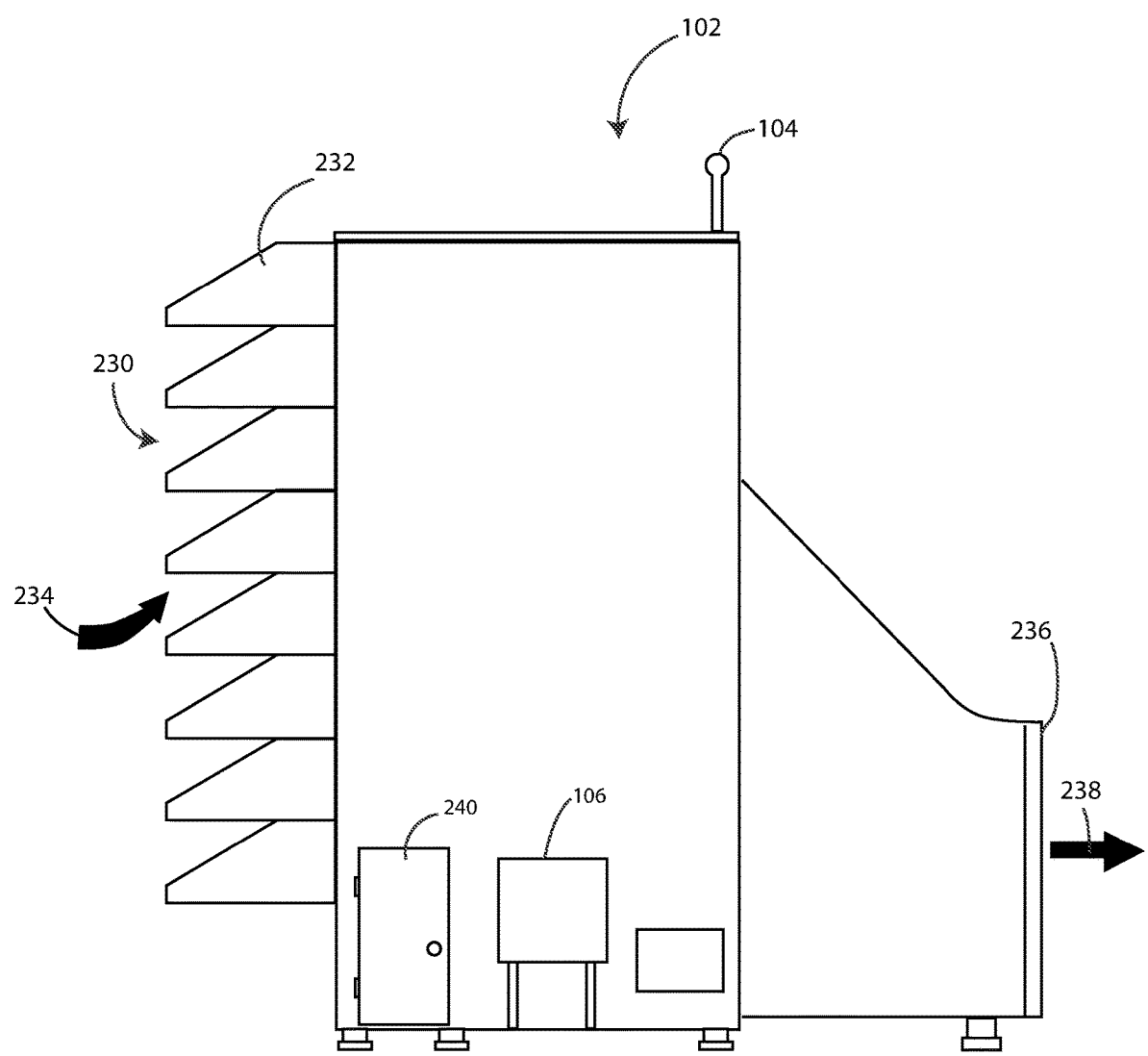
FIG. 2 is a schematic side view of a filtration system in accordance with various embodiments herein.

Referring now to FIG. 2, a schematic side view of a filtration system 102 is shown in accordance with various embodiments herein. Serving as an example of a particular form of a filtration system herein, FIG. 2 shows a filtration system 102 in the form of a gas turbine air inlet filtration system. It is understood the filtration system 102 could be used as air inlet filtration system for other applications as well. In addition, it will be appreciated that embodiments described herein are not limited to air intake/inlet applications, but can also include dust/particulate collector applications (cartridge based, bag based, and the like), exhaust filtration applications, etc.

The filtration system 102 can include an air inlet 230. In some embodiments, the air inlet 230 can include one or more hoods 232, such as to prevent rain, snow, or other precipitation from entering the filtration system 102. In some embodiments, the hoods 232 can include a screen or mesh to prevent leaves, sticks, branches, or other large particulate from entering the filtration system 102.

Dirty or unfiltered air can enter the filtration system 102 at the air inlet 230 in the direction of arrow 234. The air can pass through a filter element (shown in FIG. 3) to remove dust or other particulate from the air. The air can then be directed out of an air outlet 236 in the direction of arrow 238. In various embodiments, the air outlet 236 can be coupled to a supply air duct that can direct the clean or supply air to the desired location of use. In other embodiments, the air outlet 236 can be directly coupled to the air inlet of a gas turbine or other equipment where the supply air is desired.

The filtration system 102 can include a door 240. The door 240 can provide access to the interior of the filtration system 102, such as to allow a user to change the filtration elements or otherwise service the interior portion of the filtration system 102.

Figure 3:
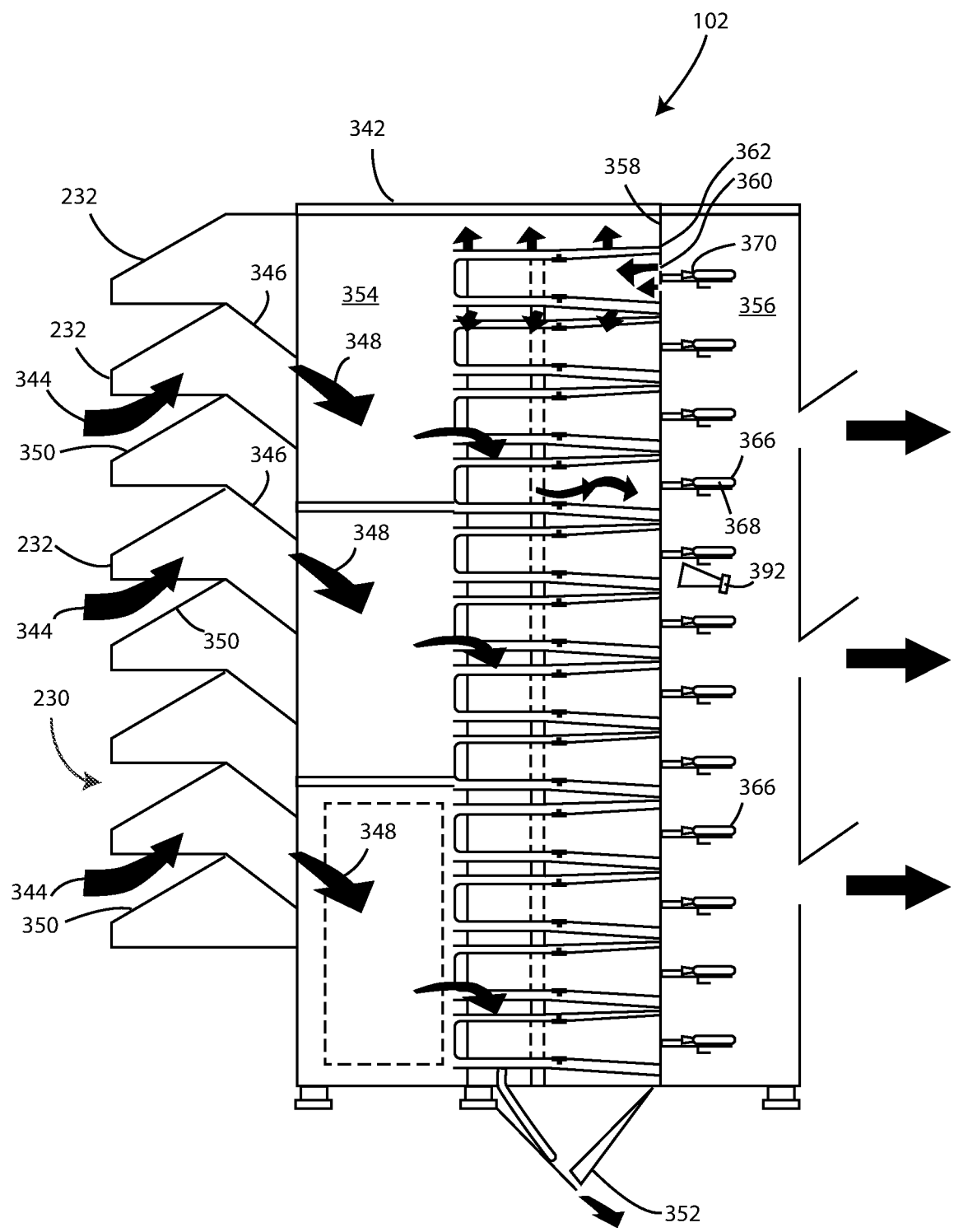
FIG. 3 is a schematic side view of the inside of a filtration system in accordance with various embodiments herein.

In FIG. 3, a schematic, cross-sectional, depiction of filtration system 102 for a gas turbine from FIG. 2 is shown. The filtration system 102 can include a chamber 342 having an air inlet 230 and an air outlet 236. Unfiltered air can enter the chamber 342 through a plurality of vertically spaced hoods 232 positioned along the air inlet 230. The inlet hoods 232 can be configured such that air entering the inlet hoods 232 is first directed in an upward direction indicated by arrow 344, and then deflected by deflector plates 346 in a downward direction indicated by arrow 348. The initial upward movement of air can cause some particulate material and moisture from the air stream to settle or accumulate on lower regions 350 of the inlet hoods 232. The subsequent downward movement of air can force dust within the chamber 342 downward toward a dust collection hopper 352 located at the bottom of the chamber 342. It should also be noted that air inlet 230 may have vanes, screens, or other mechanical moisture separator inlets.

The chamber 342 of the filtration system 102 can be divided into an upstream volume 354 and a downstream volume 356 by a tube sheet 358 (referred to also as partition 358). The upstream volume 354 generally represents the "dirty air section" of the filtration system 102, while the downstream volume 356 generally represents the "clean air section" of the filtration system 102. The partition 358 (or tube sheet) can define a plurality of apertures 360 for allowing air to flow from the upstream volume 354 to the downstream volume 356.

The filtration system 102 can include a plurality of filter element mounts 362. In this embodiment, the tube sheet 358 can include a filter element mount 362. The filter element mount(s) 362 can be configured to retain or hold a filter element 364. Each aperture 360 can be covered by an air filter element 364 in the filter element mount 362 and located in the upstream volume 354 of the chamber 342.

In various embodiments, the filter elements 364 used with embodiments herein can include, but are not limited to, cartridge filters, bag filters, POWERCORE® brand filters, mist filters, panel filters, and the like. In some embodiments, the filter elements can have a filter medium comprising at least a PTFE layer or comprises a PTFE layer on a suitable support layer. The PTFE layer can be on the upstream side of the medium.

The filter elements 364 can be in fluid communication with the air inlet 230. The filter elements 364 can be arranged and configured such that air flowing from the upstream volume 354 to the downstream volume 356 passes through the filter elements 364 prior to passing through the apertures 360.

In general, during filtering, air is directed from the upstream volume 354 through the filter elements 364. After being filtered, the air flows through the partition 358, via apertures 360, into the downstream clean air volume 356. The clean air is then drawn out from the downstream volume 356 and into a gas turbine intake, not shown.

In various embodiments, each aperture 360 of the partition 358 includes a pulse jet air cleaner 366 mounted in the downstream volume 356. The pulse jet air cleaner 366 can include a compressed gas supply 368 and a valve 370 in fluid communication with the compressed gas supply 368. As such, the system can include a plurality of valves 370. In various embodiments, opening one or more of the plurality of valves 370 results in a pulse or pulses of a gas directed at the filter element.

In some embodiments, the valve 370 can include a solenoid operated valve or a diaphragm valve. In various embodiments, the compressed gas supply 368 can include a gas supply manifold 372. In some embodiments, the gas supply manifold 372 is configured to direct compressed air to each of the valves 370.

Opening the valve 370 can result in a pulse of gas directed at the filter element 364, such as to clean the filter or remove particulate build up on the dirty side of the filter. The pulse of gas can be directed at the filter element 364 in the reverse direction of normal airflow through the filter element 364, i.e. from the downstream volume 356 side of the filter element 364, such as to shake or otherwise dislodge particular material trapped in or on filter element 364.

As mentioned above, in some embodiments, the filtration system 102 can include a local control circuit. The local control circuit can be configured to control the valves 370, such as for compressed gas cleaning of the filter elements 364. The control circuit can be configured to initiate opening the valves 370 in response to a data input indicating that a pressure drop threshold has been crossed, such as to clean the filters as an increased pressure drop across the filters can represent dirty filters.

The filter element mounts 362 and filter elements 364 can be arrayed in a pattern. For example, in some embodiments, the filter element mounts 362 and filter elements 364 can be arrayed in a grid pattern. In some embodiments, the filter element mounts 362 and filter elements 364 can be arrayed in a pattern that is not a grid. In some embodiments, the grid pattern can be a grid pattern laid out in a vertical plane, such as with vertical columns and horizontal rows. In some embodiments, the grid pattern can be a grid pattern laid out in a horizontal plane, with columns and rows perpendicular to one another, but both in the horizontal plane.

The valves 370 can include valves having various dimensions. The valves 370 can also be of various types. In some embodiments, the valves 370 can be diaphragm type valves. However, in some embodiments, at least some valves 370 can also be a rotary valve, a rising stem valve, or a linear valve. In some embodiments, one or more valves 370 can be a solenoid valve, a coaxial valve, a butterfly valve, an angle seat valve, a ball valve, a plug valve, a gate valve, a globe valve, a needle valve, or the like.

The number of valves 370 can vary. In some embodiments, the number of valves can be greater than or equal to 2, 10, 20, 40, 60, or 80 valves. In some embodiments, the number of valves can be less than or equal to 1000, 900, 800, 700, 600, 500, 400, 300, 200, 150, 100, 80 or 60 valves. In some embodiments, the number of valves can fall within a range of 2 to 1000 valves, or 10 to 900 valves, or 20 to 800 valves, or 40 to 700 valves, or 60 to 600 valves, or 10 to 100 valves.

The number filter elements 364 within the system can also vary. In some embodiments, the number of filter elements can be greater than or equal to 2, 10, 20, 40, 60, or 80 filter elements. In some embodiments, the number of filter elements can be less than or equal to 1000, 900, 800, 700, 600, 500, 400, 300, 200, 150, 100, 80 or 60 filter elements. In some embodiments, the number of filter elements can fall within a range of 2 to 1000 filter elements, or 10 to 900 filter elements, or 20 to 800 filter elements, or 40 to 700 filter elements, or 60 to 600 filter elements, or 10 to 100 filter elements.

In some embodiments, the ratio of valves to filter elements is approximately 1:1. However, in some embodiments, the ratio of valves to filter elements can be from 1:9 to 9:1, or from 1:3 to 3:1, or from 1:2 to 2:1.

In some embodiments, the filtration system may also include one or more sonic horns 392 (or sonic exciters). The sonic horn 392 can be used to provide sonic excitation to one or more of the filter elements in order to loosen and/or dislodge particles therefrom. The one or more sonic horns 392 can be used in combination of the valves providing pulses of air or can be used separately. The sonic horn can emit sonic energy at various frequencies. In some embodiments, the sonic horn can emit sonic energy at a human inaudible frequency, such as below 20 Hz and/or above 20 KHz. In some embodiments, the sonic horn can emit sonic energy at a frequency that is typically audible to humans, such as between 20 Hz and 20 KHz. In some particular embodiments, the sonic energy can include that in a frequency range of 60 to 250 Hz. The magnitude (or sound pressure) of the sonic energy can vary. In some embodiments, the magnitude can be measured in decibels and can be about 40 dB, 50 dB, 60 dB, 70 dB, 80 dB, 90 dB, 100 dB, 110 dB, 120 dB, 130 dB, 140 dB, 150 dB, or more, or an amount falling within a range between any of the foregoing. In addition, the waveform of the sonic energy can vary. Various types of sonic horns can be used including, for example, compressed air driven sonic horns. Sonic horns can include subcomponents including, but not limited to, a diaphragm, a driver, an air supply input, and a bell or a horn. Exemplary sonic horns are commercially available and can include those such as the MARTIN® sonic horn 230 Hz commercially available from Martin Engineering and the Model CD-70 sonic horn commercially available from Industrial Accessories Company.

Figure 4:
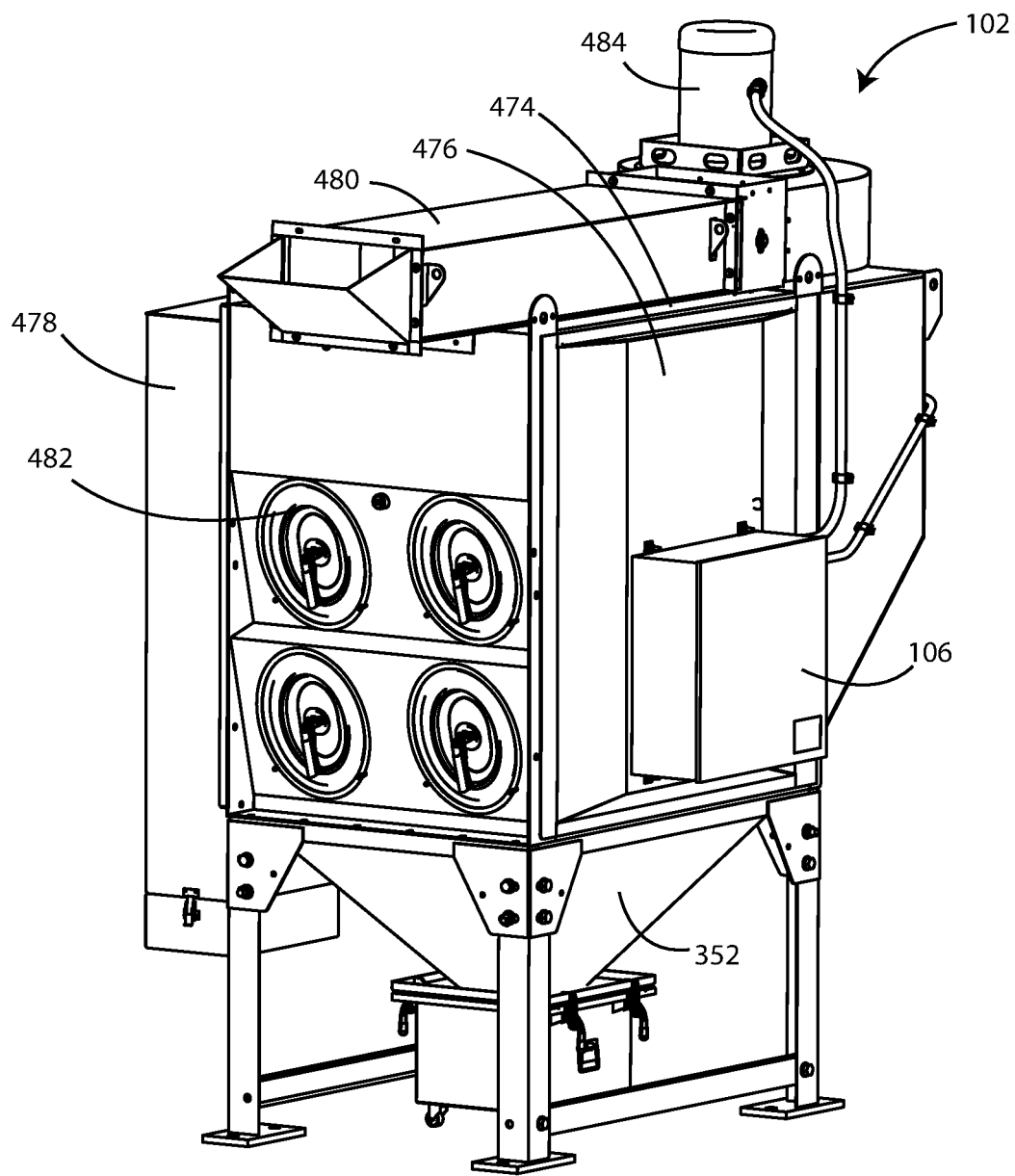
FIG. 4 is a perspective view of a filtration system in accordance with various embodiments herein.

Filtration systems herein can include both those installed outdoors and those installed indoors. Referring now to FIG. 4, a schematic perspective view is shown of another type of air filtration system 102 in accordance with embodiments herein. In this shown embodiment, the air filtration system 102 is generally in the shape of a box and includes an upper wall panel 474, and two pairs of opposite side wall panels 476 (one of which is depicted in FIG. 4). It will be appreciated, however, that the air filtration system 102 can take on many different shapes and configurations. In some embodiments, such as shown in FIG. 4, the filtration system 102 can form a part of an industrial air filtration system, such as for a manufacturing or production facility. In some embodiments, these filtration systems 102 can be designed to be indoors.

The air filtration system 102 can include a dirty air conduit or air inlet 478 for receiving dirty or contaminated air (i.e., air with particulate matter therein) into the air filtration system 102. A clean air conduit or air outlet 480 (see, e.g., FIG. 5) can be provided for venting clean or filtered air from the air filtration system 102. The air filtration system 102 can include access openings 482 for multiple filter elements (not shown in FIG. 4). In use, each of the access openings 482 can be sealed by a cover (not shown) such that dirty air entering the air filtration system 102 does not escape through the access openings 482.

The air filtration system 102 may also include a hopper 352 to collect particulate matter separated from the dirty air stream as described herein. The hopper 352 can include sloped walls to facilitate collection of the particulate matter and can, in some embodiments, include a driven auger or other mechanism for removing the collected particulate matter.

In some embodiments, the air filtration system 102 can include a fan or blower 484 to provide movement of air through the air filtration system 102, typically mounted so as to be pulling air through the system from the clean side. However, in other embodiments, air can be pushed or pulled through the system with a fan or other equipment that is not part of the air filtration system 102. The air filtration system 102 can include a control unit 106, which can include a control circuit for the filtration system 102.

Figure 5:
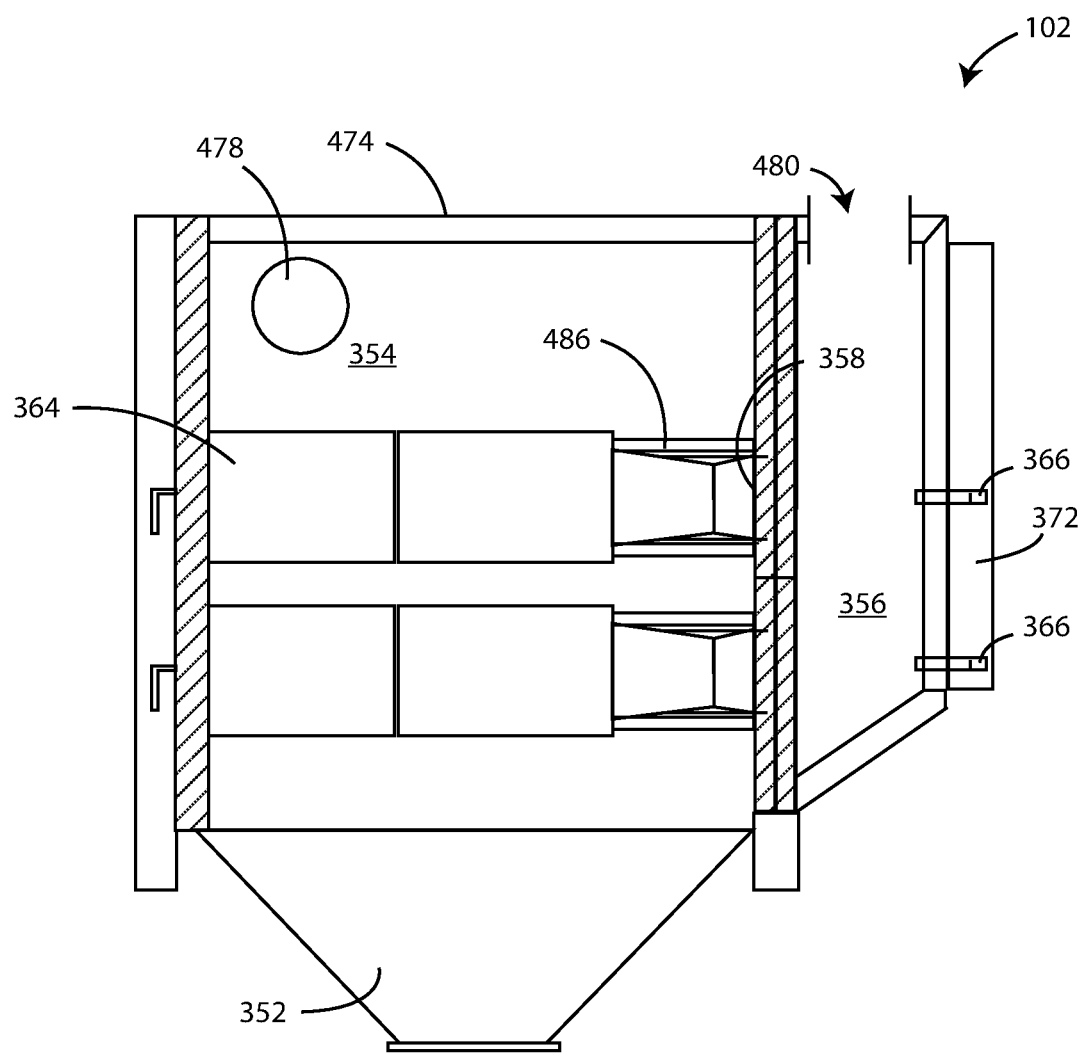
FIG. 5 is a schematic side view of the inside of a filtration system in accordance with various embodiments herein.

Referring now to FIG. 5, a schematic cross-sectional view is shown of some aspects of an air filtration system 102 in accordance with various embodiments herein. The interior of the air filtration system 102 includes a tube sheet 358 (or similar structure) that separates the interior of the housing into a downstream volume 356 and an upstream volume 354.

The air filtration system 102 can include pulse collectors 486 and filter elements 364 in the upstream volume 354 (dirty side). The pulse collectors 486 can be attached to the tube sheet 358 over an aperture in the tube sheet 358 (not seen in FIG. 5) such that a pulse of air from the pulse jet air cleaners 366 passing through the pulse collector 486 enters an interior volume of the filter elements 364. Air can be provided to the jet air cleaners 366 from a gas supply manifold 372, which itself can receive compressed air from an air compressor or central source of plant compressed air.

As discussed above, the filtration system 102 can include a control circuit configured to control the one or more valves 370. In various embodiments, the control circuit can be in electrical communication with the communication circuit, such as to exchange data or instructions. The communication circuit can receive data, such as from data network 122, such as data related to a valve actuation pattern. The control circuit can be configured to initiate opening the valve(s) 370 according to a valve actuation pattern.

In some embodiments, the control circuit is configured to initiate opening the valves according to a first mode of operation and a second mode of operation. The first mode of operation can include opening valves according to a first valve actuation pattern. The second mode of operation can include opening valves according to a second valve actuation pattern.

In some embodiments, a particular mode of operation may only be engaged if a filter element of a particular type is mounted on the filter element mount. In some embodiments, the filter element can include an RFID chip, barcode or other identification that can be read by the system. In some cases, the filter element mount can include an identification reader element to recognize the type of filter installed in the mount. The identification reader element can be in electrical communication with the control circuit to relay the read identification information.

Figure 6:
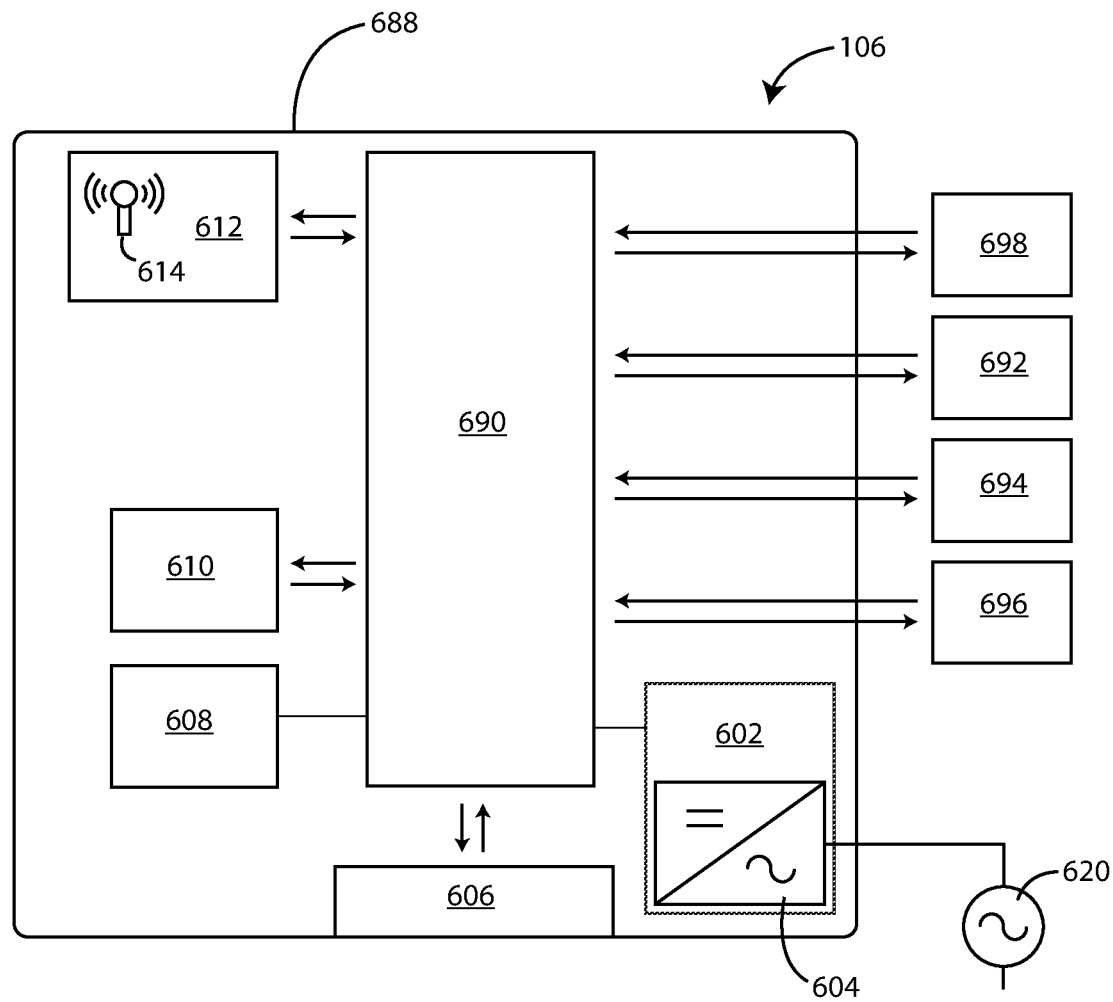
FIG. 6 is a schematic diagram of a control system in accordance with various embodiments herein.

Referring now to FIG. 6, a schematic diagram is shown of elements of a control unit 106 in accordance with various embodiments herein. It will be appreciated that a greater or lesser number of components can be included with various embodiments and that this schematic diagram is merely illustrative. In some embodiments, the control unit 106 may be a part of the filtration system as a part of the original equipment thereof. However, in other embodiments, the control unit 106 may be part of a retrofit device. In this embodiment, the control unit 106 can include a housing 688 and a control circuit 690.

The control circuit 690 can include various electronic components including, but not limited to, a microprocessor, a microcontroller, a FPGA (field programmable gate array) chip, an application specific integrated circuit (ASIC), or the like.

In various embodiments, the control unit 106 can include a first pressure sensor 692 (as used herein, reference to a pressure sensor shall include a pressure transducer unless the context dictates otherwise) and a second pressure sensor 694. In some embodiments, the first pressure sensor 692 can be in fluid communication with the upstream volume or dirty air chamber and the second pressure sensor 694 can be in fluid communication with the downstream volume or clean air chamber, such as to measure the pressure drop across the filter elements.

In various embodiments, the control unit 106 can include a third pressure sensor 696. The third pressure sensor 696 can be in fluid communication with the compressed air manifold. As such, the third pressure sensor 696 can be in fluid communication with a compressed gas supply.

In some embodiments, a plurality of pressure sensors can be used. For example, in some embodiments, at least one pressure sensor can be used for every filter element in the system. In some embodiments, at least one pressure sensor can be used for every zone or grouping of filter elements in the system. In some embodiments, the system can include from 2 to 1000 pressure sensors.

Pressure sensors herein can be of various types. Pressure sensors can include, but are not limited to, strain gauge type pressure sensors, capacitive type pressure sensors, piezoelectric type pressure sensors, and the like. In some embodiments, pressure sensors herein can be MEMS-based pressure sensors.

The processing power of the control circuit 690 and components thereof can be sufficient to perform various operations including various operations on data from sensors (such as pressure sensors 692, 694, and 696) including, but not limited to averaging, time-averaging, statistical analysis, normalizing, aggregating, sorting, deleting, traversing, transforming, condensing (such as eliminating selected data and/or converting the data to a less granular form), compressing (such as using a compression algorithm), merging, inserting, time-stamping, filtering, discarding outliers, calculating trends and trendlines (linear, logarithmic, polynomial, power, exponential, moving average, etc.), predicting filter element EOL (end of life), identifying an EOL condition, predicting performance, predicting costs associated with replacing filter elements vs. not-replacing filter elements, creating new valve actuation patterns, selecting valve actuation patterns, retrieving valve actuation patterns, evaluating efficacy of valve actuation patterns, and the like.

Normalizing operations performed by the control circuit 690 can include, but are not limited to, adjusting one or more values based on another value or set of values. As just one example, pressure drop data reflective of pressure drop across a filter element can normalized by accounting for air flow rate or a value that serves as a proxy thereof.

In various embodiments the control circuit can calculate a time for replacement of a filter element and generate a signal regarding the time for replacement. In various embodiments, the control circuit can calculate a time for replacement of a filter element and issue a notification regarding the time for replacement through a user output device. In various embodiments, the control circuit can calculate a time for replacement of a filter element based on signals from the first pressure sensor and the second pressure sensor. In various embodiments, the control circuit can calculate a time for replacement of a filter element based on signals from the first pressure sensor and the second pressure sensor and an external input. The external input can be received from a system user or from a remote location through a data communication network.

In various embodiments, control circuit initiates an alarm if a predetermined alarm condition has been met. The alarm condition can include one or more a maximum value for a signal received from the first pressure sensor, a minimum value for a signal received from the first pressure sensor, a maximum value for a signal received from the second pressure sensor, a minimum value for a signal received from the second pressure sensor, a maximum difference between a value for a signal received from the first pressure sensor and a value for a signal received from the second pressure sensor, and a minimum difference between a value for a signal received from the first pressure sensor and a value for a signal received from the second pressure sensor.

In various embodiments, the control circuit 690 can be configured to calculate a value correlated to a fluid flow rate through the filtration system based on a value provided by the first pressure sensor and a value provided by the second pressure sensor. In some embodiments, the control circuit 690 can be configured to calculate a value correlated to a fluid flow rate through the filtration system based on a static pressure value, wherein the static pressure value by a signal from at least one of the first pressure sensor and the second pressure sensor. In some embodiments, the control circuit can be configured to calculate a value correlated to a fluid flow rate through the filtration system based on a differential pressure value and a static pressure value, wherein the differential pressure value is determined by a signal from both the first pressure sensor relative and the second pressure sensor and the static pressure value by a signal from one of the first pressure sensor and the second pressure sensor.

In various embodiments, the control circuit 690 is configured to control actuation of the plurality of valves 370. In various embodiments, the control circuit 690 is configured to operate in a first mode, wherein operating in a first mode includes opening valves according to a first valve actuation pattern. In various embodiments, the control circuit 690 is configured to operate in a second mode, wherein operating in the second mode includes opening valves according to a second valve actuation pattern. In various embodiments, the control circuit 690 is configured to periodically switch from the first mode to the second mode and then compare the efficacy of the two modes. In various embodiments, the control circuit 690 is configured to select the second valve actuation pattern of the second mode from amongst a set of preconfigured valve actuation patterns. In various embodiments, the control circuit 690 is configured to receive the second valve actuation pattern from a remote site. In various embodiments, the control circuit 690 is configured to generate the second valve actuation pattern. In various embodiments, the control circuit 690 is configured to receive the second valve actuation pattern as input from a system user.

In various embodiments, the control circuit 690 can be configured to evaluate efficacy of a valve actuation pattern based on a magnitude of a change in pressure drop in the filtration system 102 achieved resulting from execution of a valve actuation pattern. In various embodiments, the system can include flow sensors and the control circuit 690 can be configured to evaluate efficacy based on a magnitude of a change in air flow velocity (such as can be measured as it impinges on the filter element) in the filtration system 102 achieved resulting from execution of a valve actuation pattern. In various embodiments, the first mode represents a default operating mode. In various embodiments, the control circuit 690 adopts the second mode as a new default mode if the efficacy of the second mode is better than the efficacy of the first mode.

In various embodiments, the second valve actuation pattern is different than the first valve actuation pattern in at least one operational parameter. In various embodiments, the operational parameters are selected from the group consisting of a horizontal actuation sequence, a vertical actuation sequence, a zone actuation sequence, a linked group actuation sequence, a valve opening time, an amount of time between sequential valve actuations, and a threshold pressure drop for triggering valve actuation.

The control circuit 690 selects the second valve actuation pattern in various ways. In some embodiments, the control circuit 690 selects the second valve actuation pattern of the second mode based on factors including temporal factors (time of the day, day of week, day of month, etc.). In various embodiments, the control circuit 690 selects the second valve actuation pattern of the second mode based on a pattern matching algorithm. For example, data to be used in pattern matching can include one or more of the type of filtration system, the type of filter elements, the type of valves, the configuration of the filter elements and valves, current conditions (temperature, humidity, precipitation, etc.), predicted conditions (temperature, humidity, precipitation, etc.), operational status of the system or facility for which filtration is being performed, work shift status, data regarding dust/contaminants to be filtered out (such as may be input by a user, detected using a sensor such as an optical sensor, an electrical property sensor, a chemical sensor, or the like), and/or other parameters discussed herein, amongst other things. The pattern matching algorithm can find a valve actuation pattern that is most likely to be beneficial based on the set of data used to find a match. Various techniques can be used for pattern matching herein. By way of example, in some embodiments, a least squares approach can be used for pattern matching. In some embodiments, a random sample consensus (RANSAC) approach can be used. In some embodiments, a Hough transform based approach can be used. In some embodiments, a statistical approach or a machine learning approach can be used.

In various embodiments, the control circuit 690 is configured to select a valve actuation pattern and execute the same such that valves are actuated in a sequence according the determined valve actuation pattern. In various embodiments, the control circuit 690 is configured to select a valve actuation pattern by selecting a valve actuation pattern from a set of predetermined valve actuation patterns. In various embodiments, the control circuit 690 is configured to select a valve actuation pattern based on a set of criteria including current weather and environmental conditions. In various embodiments, the control circuit 690 is configured to select a valve actuation pattern based on a set of criteria including data regarding particulates flowing into the filtration system 102. In various embodiments, the control circuit 690 is configured to select a valve actuation pattern based on a set of criteria including current temperature and humidity. In various embodiments, the control circuit 690 is configured to select a valve actuation pattern based on current weather and environmental conditions including, but not limited to, snowstorms, sandstorms, pollen loads, and plant debris. In various embodiments, the control circuit 690 is configured to select a valve actuation pattern based on a set of criteria including predicted temperature, humidity, and/or weather conditions. In various embodiments, the control circuit 690 is configured to select a valve actuation pattern based on current or anticipated icing conditions. In various embodiments, the data regarding particulates flowing into the filtration system 102 is sensor-based, sampling based, and/or user-input based.

In various embodiments, the control circuit 690 is configured to select a valve actuation pattern based on a set of criteria including information such as the timing of labor shift changes within a plant or work facility. For example, a particular valve actuation pattern may be better for conditions associated with a particular labor shift (morning, afternoon, night, etc.) while a different valve actuation pattern may be better for conditions associated with a different labor shift.

In various embodiments, the control circuit 690 is configured to generate new valve actuation patterns by modifying parameters of existing valve actuation patterns. For example, the control circuit 690 can modify one or more parameters of an existing valve actuation pattern in order to create a second valve actuation pattern. In some embodiments, a single parameter can be modified at a time when generating new valve actuation patterns. In some embodiments, two new patterns can be generated by taking a particular parameter and then increasing it (or changing it in one way) to form a first new pattern and then decreasing it (or changing it in an opposite way) to form a second new pattern. In a basic example, this process can be repeated multiple times with different combinations of parameters such that eventually a number of patterns can be generated sufficient to represent combinations of all parameters that can be varied or changed. However, as described further below, in various embodiments the system herein can test new valve actuation patterns empirically to determine their efficacy. Feedback from this testing process can guide the generation of new valve actuation patterns. For example, if increasing parameter A shows a decrease in efficacy, then in various embodiments herein the generation of new valve actuation patterns by the system may not include an increase in parameter A, but may focus on varying other parameters and/or a decrease in parameter A. In this manner, the system can efficiently "search" through all possible parameter combination to find an optimized valve actuation pattern as quickly as possible. Various optimization algorithms, iterative methods, and/or heuristic algorithms can be used by systems herein.

Parameters for modification can include one or more of a horizontal actuation sequence, a vertical actuation sequence, a zone actuation sequence, a linked group actuation sequence, a valve opening time, an amount of time between sequential valve actuations, a threshold pressure drop for triggering valve actuation, and/or any other operational parameter discussed herein as well as others. In various embodiments, the control circuit 690 is configured to store generated valve actuation patterns as a part of a set of preconfigured valve actuation patterns.

In various embodiments, the control circuit 690 is configured to trigger actuation of at least one other treatment in combination with valve actuation patterns. In various embodiments, the other treatments include sonic excitation. For example, the system can include one or more sonic horns or other devices in order to provide sonic excitation. In some embodiments, the frequency of sonic excitation can be varied in order to maximize breaking up the particulate matter on a filter (or dust cake). In some embodiments, varying of the sonic excitation frequency (or pattern of frequencies) can be performed by the system as part of an exploratory process to identify the best activation pattern.

In various embodiments, the control circuit 690 is configured to evaluate the efficacy of a particular valve actuation pattern. The efficacy can be measured in various ways. In some embodiments, efficacy is assessed based on a magnitude of pressure drop recovery in the filtration system 102 achieved resulting from execution of a valve actuation pattern. For example, the change in pressure drop (such as the difference between upstream and downstream pressures) when evaluating pressure drop before and after execution of a valve actuation pattern In various embodiments, efficacy is assessed based on a magnitude of sustained pressure drop recovery in the filtration system 102 achieved resulting from execution of a valve actuation pattern. For example, using a value that can be obtained by integrating the change in pressure drop over a period of time resulting from a particular valve actuation pattern. The period of time for such a measurement can vary. In some embodiments, the period of time can be about 10, 20, 30, 45, or 60 seconds, or about 2 minutes, 5 minutes, 10 minutes, or 30 minutes or more, or an amount of time falling within a range between any of the foregoing.

In some embodiments, the control unit 106 can include a fourth sensor 698, such as an accelerometer, a barometric sensor, a temperature sensor, a humidity sensor, a light sensor, an optical particle detector, a particulate type sensor, a dust sensor, a flow sensor, a gas flow velocity sensor, or the like. For example, the control unit 106 can include a 3-axis accelerometer. The 3-axis accelerometer can be used to detect vibrations transmitted from or within the filtration system. The vibrations can result from various events such as periodically pulsing a brief jet of pressurized air into the interior of the filter element to reverse the air flow through the filter element and/or valve(s) opening or closing to accomplish the same. In some embodiments, the fourth sensor 698 can be used to confirm the humidity or the wind speed.

In some cases, a fourth sensor 698 or additional sensor can be mounted in the housing 688. In some embodiments, an additional sensor can be mounted in the filtration system, such as in the air inlet or air outlet. In various embodiments, an additional sensor (which could be a fifth sensor, or sixth sensor, or more or less) can be mounted outside of the filtration system, such as to measure wind speed or solar light.

In various embodiments, the control unit 106 can include a power supply circuit 602. In some embodiments, the power supply circuit 602 can include various components including, but not limited to, a rectifier 604, a capacitor, a power-receiver such as a wireless power receiver, a transformer, a battery, and the like. The power supply circuit 602 can be in electrical communication with a source of power 620.

In various embodiments the control unit 106 can include an input/output device 606. The input/output device 606 can include various components for visual and/or audio output including, but not limited to, lights (such as LED lights), a display screen, a speaker, and the like. The input/output device 606 can also include components for input such as a touchscreen, a keyboard, and the like. In some embodiments, the output device can be used to provide notifications or alerts to a system user such as current system status, an indication of a problem, a required user intervention, a proper time to perform a maintenance action, or the like.

In various embodiments the control unit 106 can include memory 608 and/or a memory controller. The memory can include various types of memory components including dynamic RAM (D-RAM), read only memory (ROM), static RAM (S-RAM), disk storage, flash memory, EEPROM, battery-backed RAM such as S-RAM or D-RAM and any other type of digital data storage component. In some embodiments, the electronic circuit or electronic component includes volatile memory. In some embodiments, the electronic circuit or electronic component includes non-volatile memory. In some embodiments, the electronic circuit or electronic component can include transistors interconnected to provide positive feedback operating as latches or flip flops, providing for circuits that have two or more meta-stable states, and remain in one of these states until changed by an external input. Data storage can be based on such flip-flop containing circuits. Data storage can also be based on the storage of charge in a capacitor or on other principles. In some embodiments, the non-volatile memory 608 can be integrated with the control circuit 690.

In various embodiments the control unit 106 can include a clock circuit 610. In some embodiments, the clock circuit 610 can be integrated with the control circuit 690. While not shown in FIG. 6, it will be appreciated that various embodiments herein can include a data/communication bus to provide for the transportation of data between components. In some embodiments, an analog signal interface can be included. In some embodiments, a digital signal interface can be included.

In various embodiment the control unit 106 can include a communications circuit 612. In various embodiments, the communications circuit can include components such as an antenna 614, amplifiers, filters, digital to analog and/or analog to digital converters, and the like.

In some embodiments, the control circuit initiates a transitory change in a data recording parameter based on a signal received from the third pressure sensor. In some embodiments, the transitory change in the data recording parameter comprises increasing the resolution of the recorded data.

In some embodiments, the first pressure sensor and the second pressure generate signals discontinuously. In some embodiments, the first pressure sensor and the second pressure generate signals at predetermined time intervals.

Figure 7:
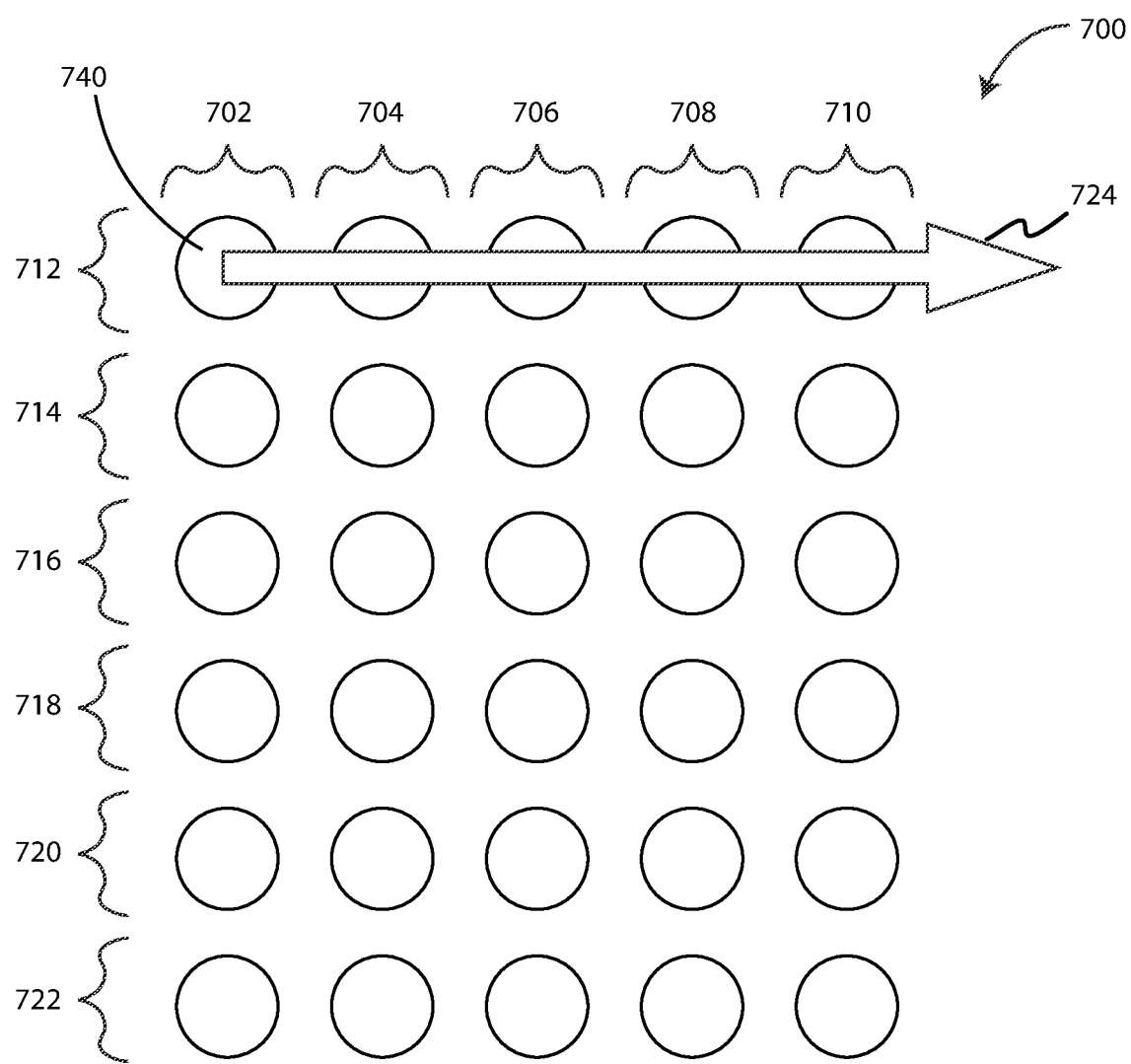
FIG. 7 is a schematic view illustrating aspects of valve actuation patterns in accordance with various embodiments herein.

Valve actuation patterns herein can include many different aspects. Referring now to FIG. 7, a schematic view illustrating some aspects of valve actuation patterns is shown in accordance with various embodiments herein. In this example, the valves 740 upon which the valve actuation pattern 700 operates includes one or more columns. In this example, the columns include columns 702, 704, 706, 708 and 710. The valves upon which the valve actuation pattern 700 operates also includes one or more rows. In this example, the rows include rows 712, 714, 716, 718, 720 and 722. The valve actuation pattern 700 can include an order of activation 724, which can be across rows and columns. The order of activation 724 can be valve by valve (e.g., one at a time in a sequence), group by group (e.g., group of valves), zone by zone, column by column, row by row, or the like. In some cases, in this example, the order of activation 724 may represent activation of the topmost valve in column 702, followed by the topmost valve in column 704, and so on sequentially. However, in some embodiments, the order of activation 724 may represent activation of the topmost valve in columns 702, 704, 706, 708, and 710 simultaneously. Thus, in some cases, multiple valves can be actuated simultaneously. In other embodiments, groups of valves are not actuated simultaneously.

Patterns herein can vary substantially. In some embodiments, patterns can follow a generally top down scheme (for example, valves at the top of a system being actuated followed by valves at successive lower levels being actuated). However, in some embodiments, patterns can follow a generally bottom up scheme (for example, valves at the bottom of a system being actuated followed by valves at successive higher levels being actuated). In some embodiments, patterns can follow schemes that alternate between top and bottom valves. In some embodiments, patterns can follow schemes where a first sweep across the valves in a system is different than a second sweep across the valves in the system (such as a full top down sweep starting at the very top and going to the very bottom followed by a partial top down sweep starting at a level below the very top and going to the very bottom or a level above the very bottom). In some embodiments, patterns can follow an outer to inner scheme (for example, valves on the lateral edges of the array of valves actuated first followed by valves that are closer to the center). In some embodiments, patterns can follow an inner to outer scheme (for example, valves that are near the center of the array of valves actuated first followed by valves that are closer to the lateral edges of the array).

TABLE 1 below illustrates some examples of how valve actuation can work at different time points as a part of a valve actuation pattern. In example 1, the valve actuation pattern goes by individual valve. As such, valve 1 is actuated at time point 1, valve 2 is actuated at time point 2, and so on. In example 2, the valve actuation pattern goes by groups of valves. As such, valves in group 1 are actuated at time point 1, valves in group 2 are actuated at time point 2, and so on. In some cases, a group can be valves within a particular row of a set of valves. In some cases, a group can be valves within a particular column of a set of valves. In some cases, a group can be a group of contiguous valves. In some cases, a group can be a group of non-contiguous valves. In some cases, a group can include some valves that are contiguous to one another and some valves that are non-contiguous. In example 3, the valve actuation pattern goes by zones of valves. As such, valves in zone 1 are actuated at time point 1, valves in zone 2 are actuated at time point 2, and so on. In some case, a zone can be valves within a particular area of an array of valves and filter elements, such as a "top zone", a "bottom zone", an "inner zone", an "outer zone", and the like.

TABLE 1

| Time Point | Example 1: By Valve | Example 2: By Group | Example 3: By Zone |
| --- | --- | --- | --- |
| T1 | Valve 1 | Group 1 | Zone 1 |
| T2 | Valve 2 | Group 2 | Zone 2 |
| T3 | Valve 3 | Group 3 | Zone 3 |
| T4 | Valve 4 | Group 4 | Zone 4 |
| T(n) | Valve (n) | Group (n) | Zone (n) |

It will be appreciated that in some embodiments, progression through a valve actuation pattern may repeat certain valves, groups, or zones. For example, in some cases, the actuation of valves that are nearest the bottom of a system (e.g., in the direction that gravity may tend to carry particulates) may be repeated more often than valves that are closer to the top of a system. TABLE 2 below illustrates some examples of how valve actuation can work at different time points as a part of a valve actuation pattern. In example 4, the valve actuation pattern includes that valve 1 is actuated at time point 1, valve 2 is actuated at time point 2, and valve 3 is actuated at time point 3. However, at time point 4, valve 1 is actuated again, then at time point 5, valve 4 is actuated. TABLE 2 also shows a similar repletion for groups (example 5) and zones (example 6).

TABLE 2

| Time Point | Example 4: By Valve | Example 5: By Group | Example 6: By Zone |
| --- | --- | --- | --- |
| T1 | Valve 1 | Group 1 | Zone 1 |
| T2 | Valve 2 | Group 2 | Zone 2 |
| T3 | Valve 3 | Group 3 | Zone 3 |
| T4 | Valve 1 | Group 1 | Zone 1 |
| T5 | Valve 4 | Group 4 | Zone 4 |
| T(n) | Valve (n) | Group (n) | Zone (n) |

It will be appreciated that various parameters of valve actuation can be varied across time points of a valve actuation pattern. For example, intensity or strength of valve actuation, can vary across time points of a valve actuation pattern. Intensity of valve actuation and the resulting pulse of air to clean a filter element can be characterized according to various parameters herein. In some embodiments, intensity can be characterized by the total volume of gas released when a valve is opened. In some embodiments, intensity can be characterized by a maximum positive slope of a pressure curve associated with air being released from a valve. In some embodiments, intensity can be characterized by a maximum velocity of air that is released from a valve. In some embodiments, intensity can be characterized by a total length of time that air is released from a valve.

As another example, a "delay factor" (or gap factor) of valve actuation can vary at time points within a valve actuation pattern. A delay factor can refer to a relative amount of time between time points (or valve actuation steps) within a valve actuation pattern or sequence. For example, in some cases, the amount of time can be approximately equivalent between valve actuation steps and represented as a delay factor of "1". The delay factor of "1" can be associated with various specific amounts of real time such as 0.1, 0.2, 0.5, 0.75, 1, 2, 3, 5, 10, 30, 60, 90, 120, 180, 360, 720, 1080 seconds, or longer, or an amount of time falling within a range between any of the foregoing. In some cases, it may be advantageous to shorten the amount of time or lengthen the amount of time. By way of example, in TABLE 3 below, the delay factor for time point "T3" is shown as 0.5.

This would mean that that the amount of time between the conclusion of T2 and the start of T3 is only half of the amount of time between the conclusion of the T1 and the start of T2. Also, in this example, time point T4, valve 1 is actuated, but at only 50% of the intensity or strength of its previous actuation at time point T1. Further, in this example, at time point T4, valve 1 is actuated, but the opening time is approximately 70 milliseconds, as opposed to 100 milliseconds for the other time points.

TABLE 3

| Time Point | By Valve | Intensity | Delay Factor | Opening Time |
| --- | --- | --- | --- | --- |
| T1 | Valve 1 | 100% | 1 | 100 ms |
| T2 | Valve 2 | 100% | 1 | 100 ms |
| T3 | Valve 3 | 100% | 0.5 | 100 ms |
| T4 | Valve 1 | 50% | 1 | 70 ms |
| T5 | Valve 4 | 100% | 1 | 100 ms |

Figure 8:
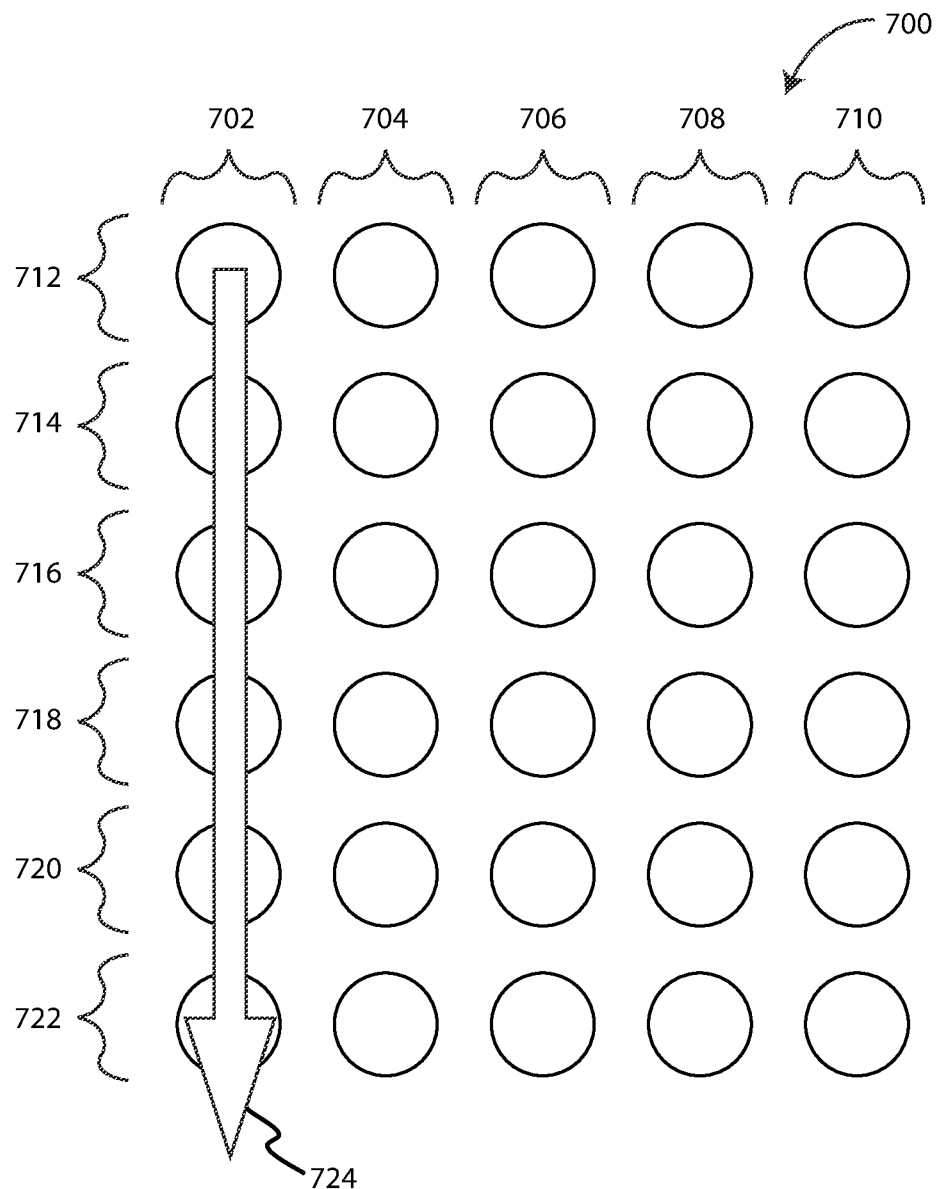
FIG. 8 is a schematic view illustrating aspects of valve actuation patterns in accordance with various embodiments herein.

In FIG. 7, the order of activation starts with the valves of row 712 and proceeds from column 702 to column 710. However, in FIG. 8 the order of activation 724 starts with the valves 740 of column 702 and proceeds from row 712 to row 722. Many different patterns are contemplated herein.

In some embodiments, valve actuation for a particular valve can occur more than once in succession. In some embodiments, valve actuation for a particular valve can occur more than once and be the same or different than a previous valve actuation of the same valve. For example, in some embodiments a valve can be actuated to provide a shorter initial pulse of air followed by a longer valve opening time. In such an example, the shorter initial pulse can be used to knock dust loose and then a longer pulse can be used to carry it away from the filter element and prevent it from immediately re-entraining. For example, a first pulse of a given filter element can be less than 70 milliseconds and a second pulse can be greater than 70 milliseconds.

Figure 9:
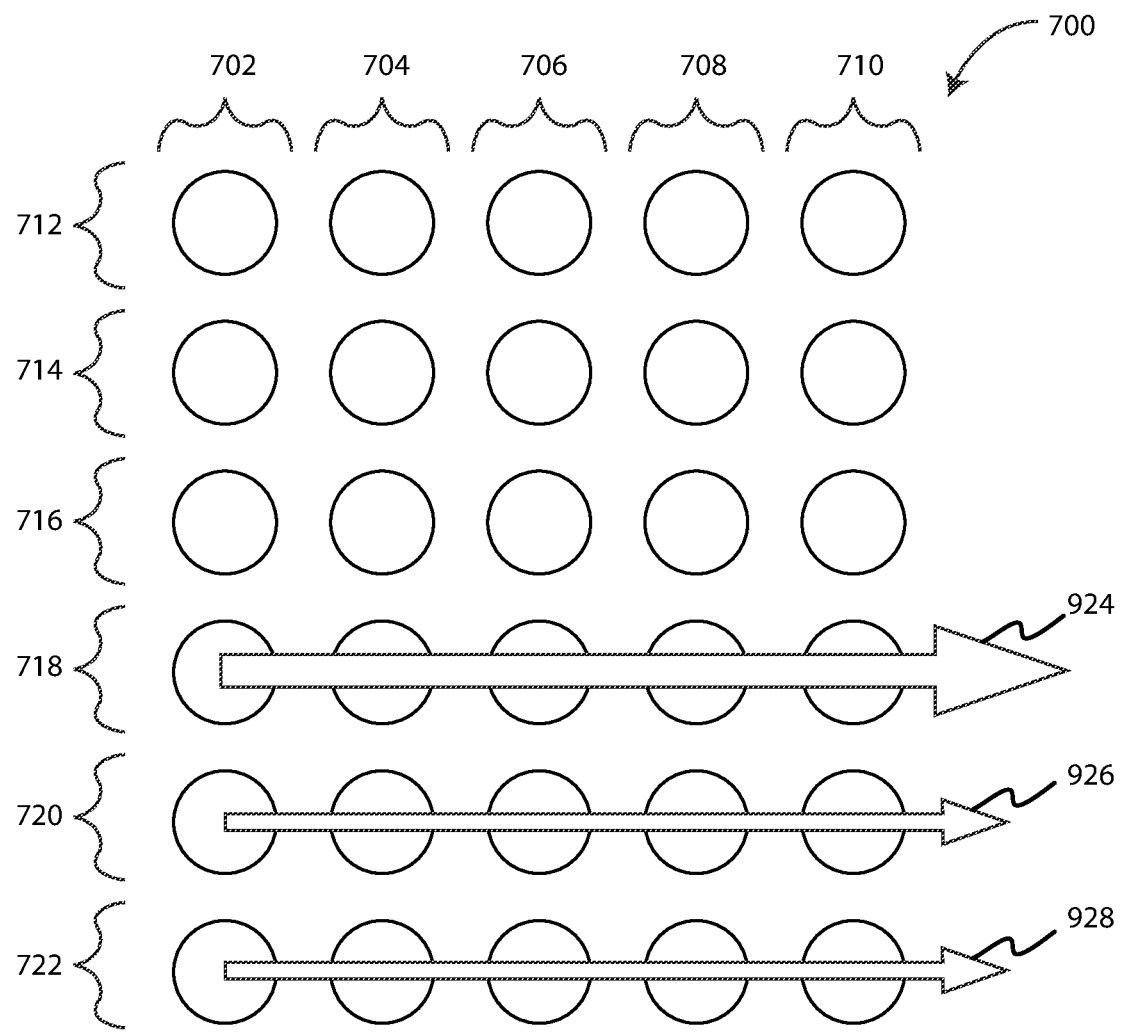
FIG. 9 is a schematic view illustrating aspects of valve actuation patterns in accordance with various embodiments herein.

Referring now to FIG. 9, a schematic view illustrating aspects of valve actuation patterns is shown in accordance with various embodiments herein. In this example, the valve actuation pattern includes a first sequence of activation 924 of valves 740, a second sequence of activation 926, and a third sequence of activation 928. The first sequence of activation 924 starts with the valves of row 718 and proceeds from column 702 to column 710. The second sequence of activation 926 starts with the valves of row 720 and proceeds from column 702 to column 710. The third sequence of activation 928 starts with the valves of row 722 and proceeds from column 702 to column 710.

As depicted by the thickness of the arrows shown in FIG. 9, in this example, the first sequence of activation 924 can differ from the second sequence of activation 926 and the third sequence of activation 928. For example, the first sequence of activation 924 could include actuation of valves sufficient to result in a different intensity as measured in terms of those factors described elsewhere herein.

Figure 10:
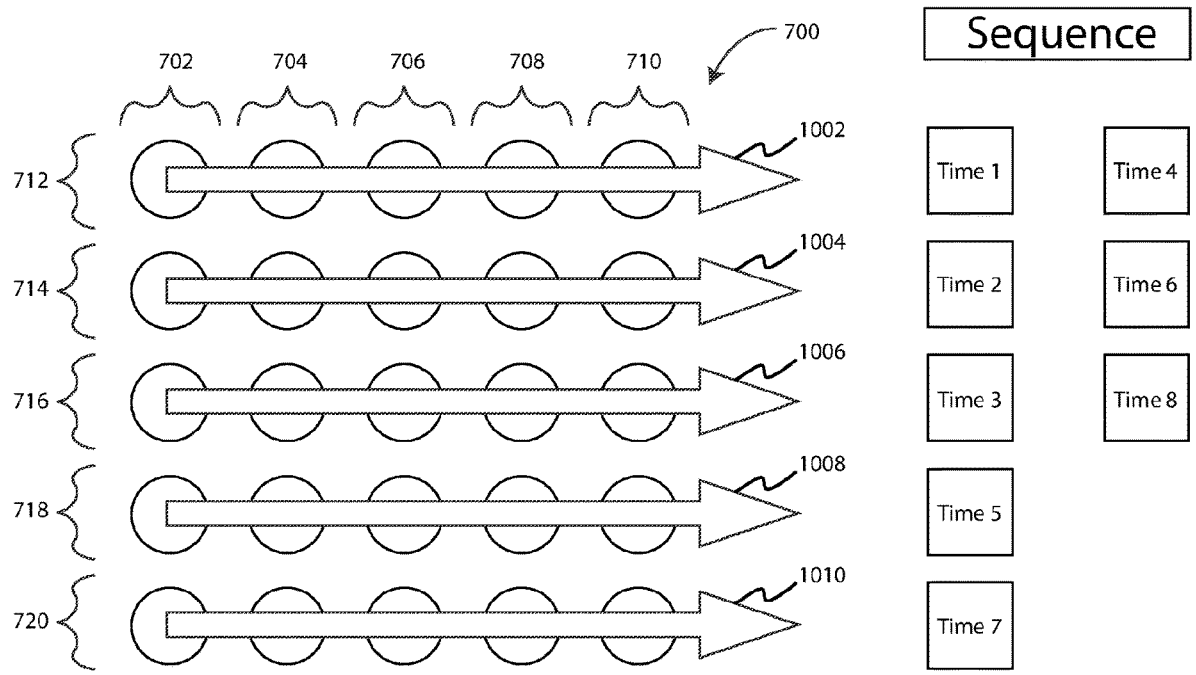
FIG. 10 is a schematic view illustrating aspects of valve actuation patterns in accordance with various embodiments herein.

Referring now to FIG. 10, a schematic view illustrating aspects of valve actuation patterns is shown in accordance with various embodiments herein. In this example, the valve actuation pattern includes a sequence of valve 740 activation that does not progress through rows of valves in order. Rather, activation of valves at some rows is repeated before the pattern is completed. For example, in this embodiment, the sequence includes activating valves of row 712 first at time 1, then row 714 second at time 2, and then row 716 third at time 3. Next, the valves of row 712 are activated again at time 4, followed by the valves of row 718 at time 5. Then the valves of row 714 are activated again at time 6 followed by the valves of row 714 at time 7. Finally, the valves of row 720 are activated again at time 7, followed by the valves of row 716 at time 8. In this pattern, a plurality of rows at the top are actuated first and then after that the valve actuation pattern alternates between the top and the bottom (or between top and bottom zones). It will be appreciated that this is merely one example of this type of top/bottom alternation and many other specific examples are contemplated herein.

Figure 11:
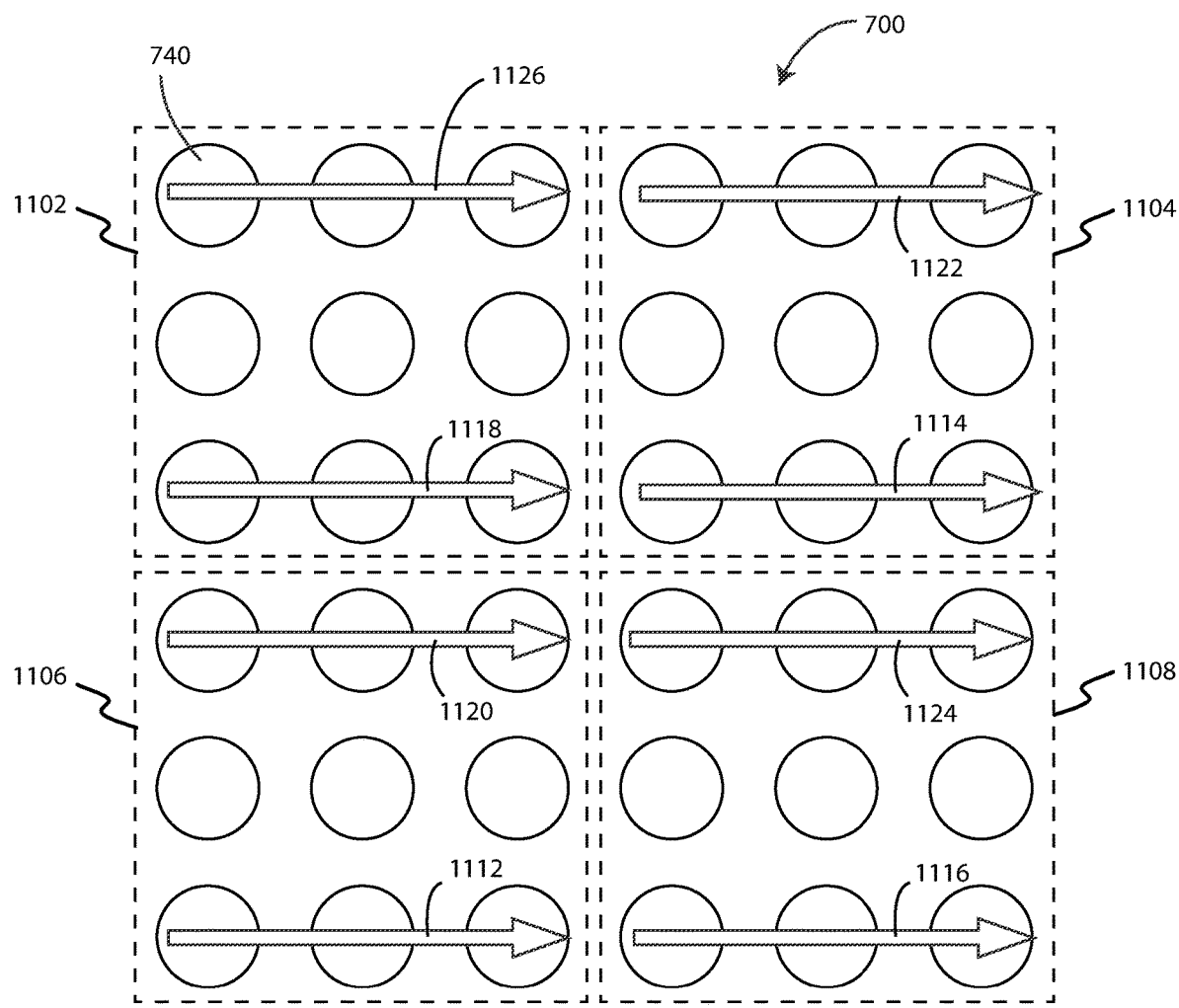
FIG. 11 is a schematic view illustrating aspects of valve actuation patterns in accordance with various embodiments herein.

In various embodiments herein, control schemes and/or valve actuation patterns can be based on groups or zones. Referring now to FIG. 11, a schematic view illustrating aspects of valve actuation patterns is shown in accordance with various embodiments herein. In this example, the valve actuation pattern includes a sequence of activation that relates to the control of groups or zones within a plurality of valves. For example, groups can be formed within a valve/filter array. The system can find groups that provide the best pulse cleaning response and then optimize pulsing patterns accordingly. In some embodiments, the system can optimize on the basis of both groups and vertical position within a group or amongst groups. In some embodiments, the system can optimize on the basis of, groups, vertical position within a group, and one or more other valve actuation parameters as described elsewhere herein.

As merely one example of how this can work, FIG. 11 shows that the valves can be grouped into a first group 1102, a second group 1104, a third group 1106, and a fourth group 1108. In this example, activation of valves at the bottom 1112 of the third group 1106 can be executed first (either simultaneously or sequentially in the direction of the arrow shown), followed by activation of the valves at the bottom 1114 of the second group 1104, followed by activation of the valves at the bottom 1116 of the fourth group 1108, followed by activation of the valves at the bottom 1118 of the first group 1102. Then activation of valves at the top 1120 of the third group 1106 can be executed first, followed by activation of the valves at the top 1122 of the second group 1104, followed by activation of the valves at the top 1124 of the fourth group 1108, followed by activation of the valves at the top 1126 of the first group 1102. In some embodiments, valves in the middle of each group can then be actuated.

Figure 12:
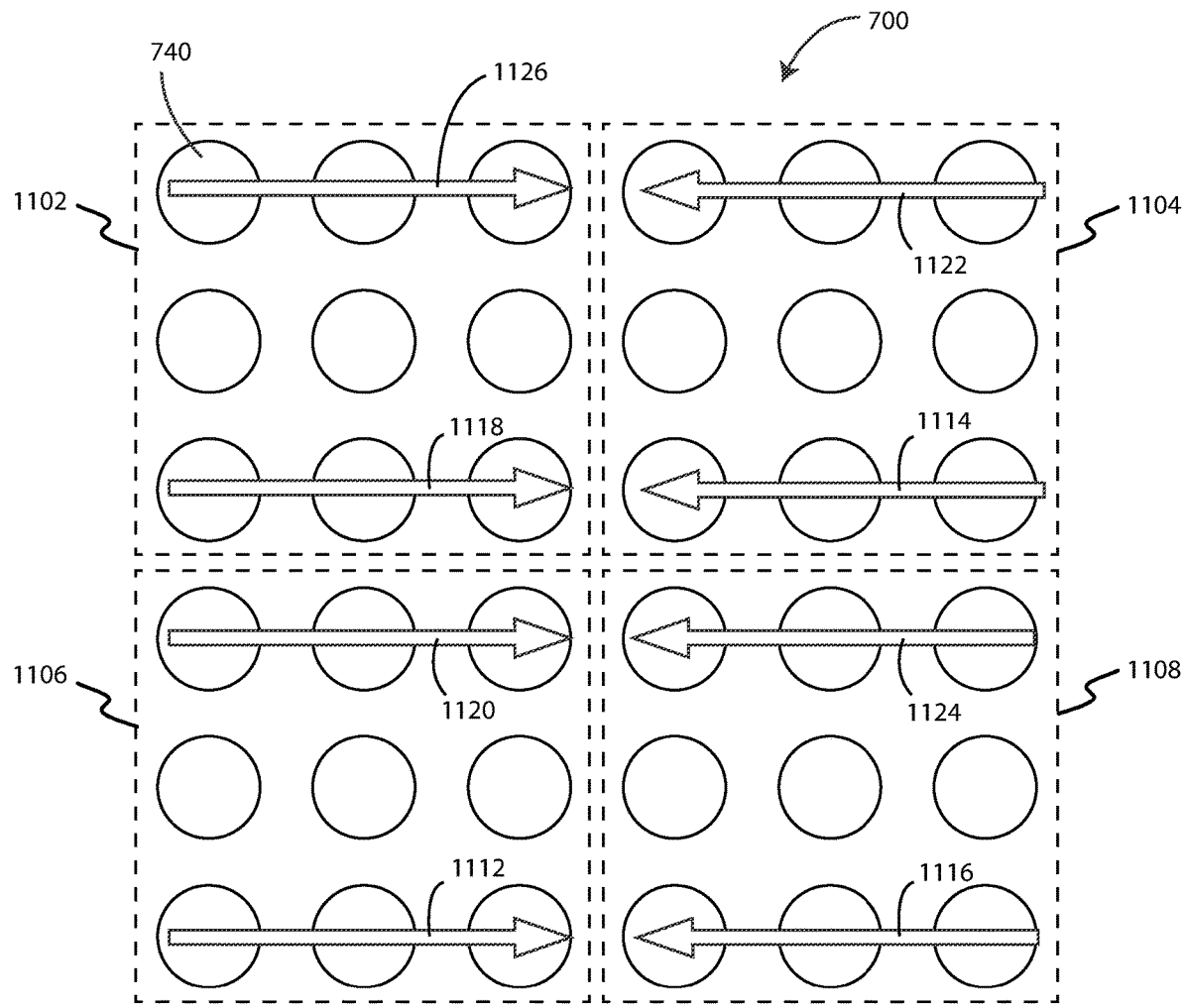
FIG. 12 is a schematic view illustrating aspects of valve actuation patterns in accordance with various embodiments herein.

As referenced above, the arrows in FIG. 11 can represent either a subgroup of valves being activated simultaneously or sequential activation of the valves within a subgroup in the direction of the arrow. Referring now to FIG. 12, a schematic view illustrating aspects of valve actuation patterns is shown in accordance with various embodiments herein. In this example, the valve actuation pattern includes a sequence of activation similar to as depicted in FIG. 11. However, in this example, the arrows can specifically represent sequential activation of valves within subgroups and the valves are activated following an out-to-in pattern.

Figure 13:
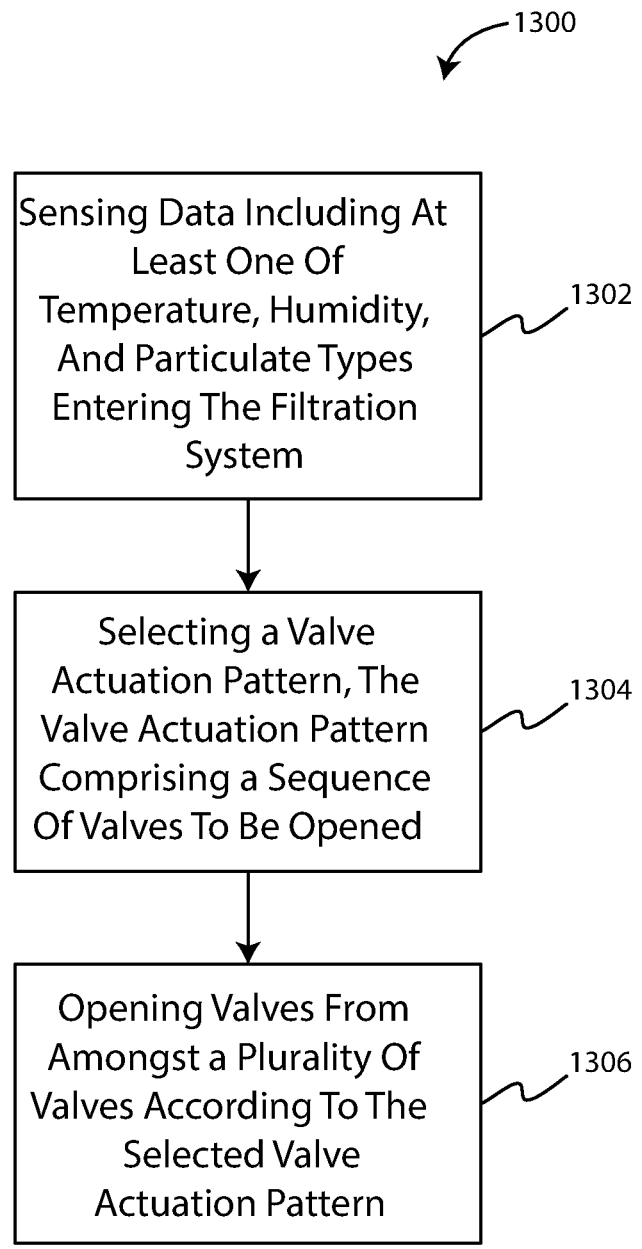
FIG. 13 is a flowchart of some operations performed in accordance with various embodiments herein.

Many different specific operations may be performed by systems and devices of embodiments herein. Referring now to FIG. 13, a flowchart of some exemplary operations performed is shown in accordance with various embodiments herein. In specific, FIG. 13 shows a method of operating a filtration system 1300. The method of operating a filtration system 1300 includes an operation of sensing data including at least one of temperature, humidity, and particulate types entering the filtration system 1302. The method also includes an operation of selecting a valve actuation pattern 1304, the valve actuation pattern comprising a sequence of valves to be opened. The method also includes an operation of opening valves from amongst a plurality of valves according to the selected valve actuation pattern 1306.

The operation of selecting a valve actuation pattern may include many different sub-operations. In various embodiment, an operation of selecting the valve actuation pattern includes selecting the valve actuation pattern from amongst a set of predetermined valve actuation patterns. In various embodiments, an operation of selecting the valve actuation pattern includes selecting the valve actuation pattern based on a set of criteria including current weather conditions. In various embodiments, an operation of selecting the valve actuation pattern includes selecting the valve actuation pattern based on a set of criteria including future predicted weather conditions. In various embodiments, an operation of selecting the valve actuation pattern includes selecting the valve actuation pattern based on a set of criteria including data regarding particulates flowing into the filtration system. In various embodiments, an operation of selecting the valve actuation pattern includes selecting the valve actuation pattern based on a set of criteria including current temperature and humidity.

In various embodiments, at least some valve actuation patterns in the set of predetermined valve actuation patterns are received from a remote source. In various embodiments, at least some valve actuation patterns in the set of predetermined valve actuation patterns are generated by a recombination of valve actuation parameters, such as by using a recombination algorithm. In various embodiments, the recombination is randomly generated. For example, each parameter of a valve actuation pattern can be randomly selected. In various embodiments, the recombination can be generated using a machine learning algorithm. In various embodiments, the recombination can be generated using an optimization algorithm, an iterative method, or a heuristic algorithm.

Figure 14:
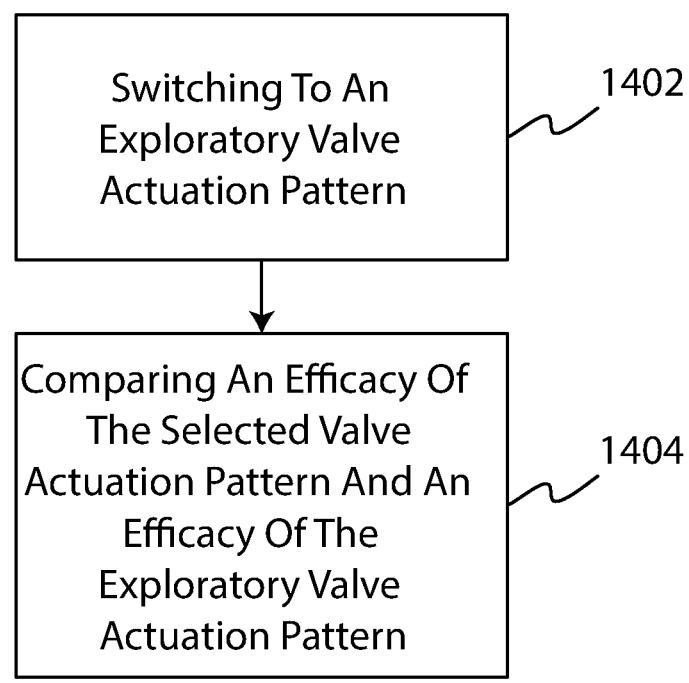
FIG. 14 is a flowchart of some operations performed in accordance with various embodiments herein.

Referring now to FIG. 14, a flowchart of some operations performed is shown in accordance with various embodiments herein. In specific, FIG. 14 shows a method of operating a filtration system including periodically switching to an exploratory valve actuation pattern 1402. The method of operating a filtration system can also include an operation of comparing an efficacy of the selected valve actuation pattern and an efficacy of the exploratory valve actuation pattern 1404.

Figure 15:
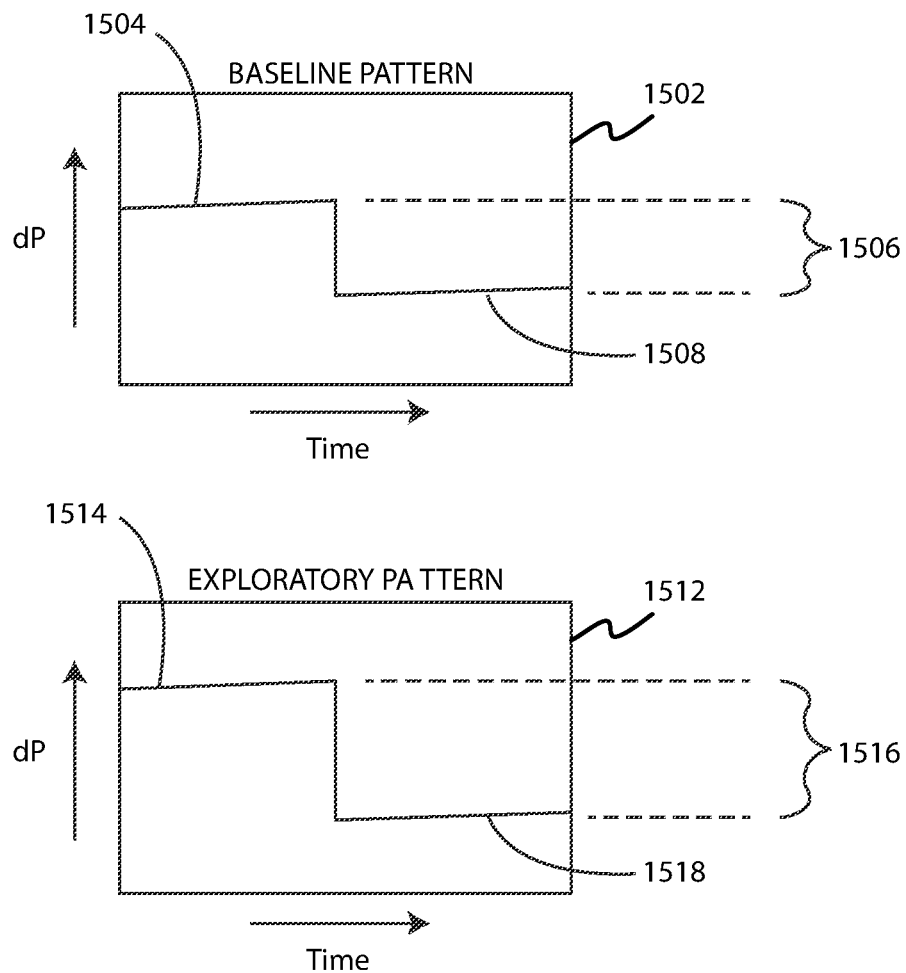
FIG. 15 is a pair of charts comparing the efficacy of valve actuation patterns in accordance with various embodiments herein.

Referring now to FIG. 15, a pair of charts illustrating a comparison of the efficacy of valve actuation patterns is shown in accordance with various embodiments herein. In particular FIG. 15 illustrates an efficacy of a baseline pattern 1502 and an efficacy of an exploratory pattern 1512. In various embodiments, the exploratory pattern (or second valve actuation pattern) can be different than the baseline pattern (or first valve actuation pattern) in at least one operational parameter. The chart illustrates a baseline pattern initial differential pressure 1504 (delta p), a baseline pattern differential pressure recovery 1506, and a baseline pattern ending differential pressure 1508. FIG. 15 also illustrates an efficacy of an exploratory pattern 1512. The chart illustrates an exploratory pattern initial differential pressure 1514, an exploratory pattern differential pressure recovery 1516, and an exploratory pattern ending differential pressure 1518. In this example, because the exploratory pattern differential pressure recovery 1516 is larger than the baseline pattern differential pressure recovery 1506, the exploratory pattern has greater efficacy than the baseline pattern. As such, in some embodiments the system can switch to adopt the exploratory pattern as a new baseline or default pattern and continue to use the adopted pattern in operation to achieve greater operating performance.

In various embodiments, the efficacy can be assessed based on a magnitude of a change in pressure drop in the filtration system 102 achieved resulting from execution of a valve actuation pattern 700. In various embodiments, the efficacy can be assessed based on a magnitude of pressure drop recovery in the filtration system 102 achieved resulting from execution of a valve actuation pattern 700. In various embodiments, the efficacy can be assessed based on a magnitude of sustained pressure drop recovery (e.g., duration of sustained pressure drop recover) in the filtration system 102 achieved resulting from execution of a valve actuation pattern 700. In various embodiments, the efficacy can be assessed based on a magnitude of a change in velocity across a filter element achieved resulting from execution of a valve actuation pattern 700. In various embodiments, the control circuit 690 adopts the second mode as a new default mode if the efficacy of the second mode can be better than the efficacy of the first mode.

Figure 16:
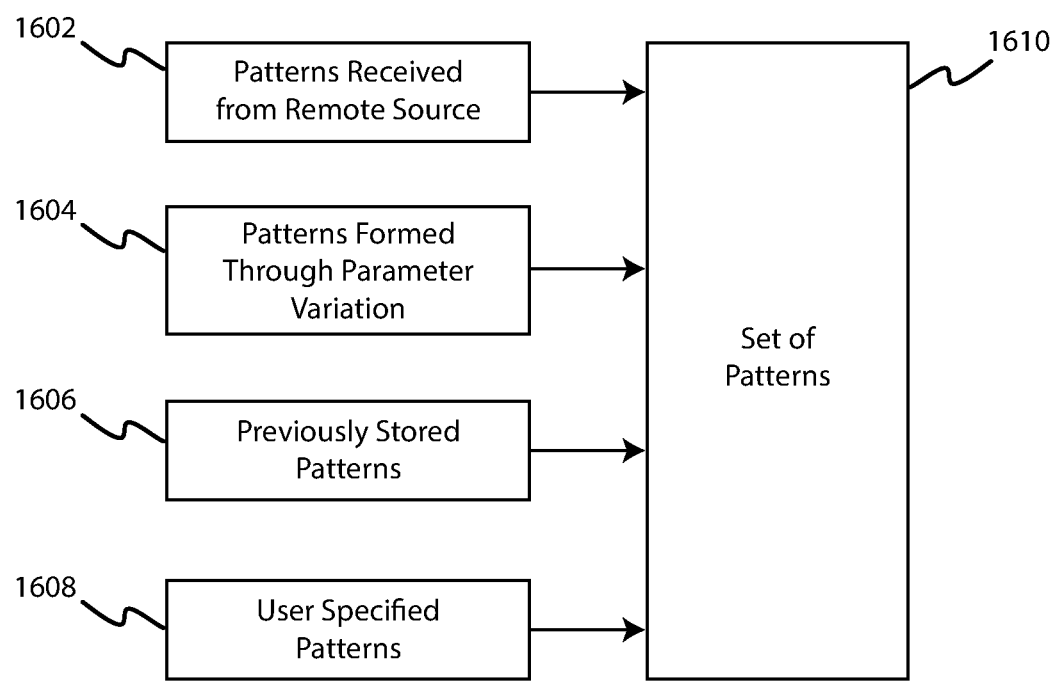
FIG. 16 is a schematic diagram illustrating some sources of valve actuation patterns in accordance with various embodiments herein.

Referring now to FIG. 16, a schematic diagram illustrating some sources of valve actuation patterns is shown in accordance with various embodiments herein. FIG. 16 shows a set of patterns 1610. The set of patterns 1610 includes one or more patterns received from remote source 1602. The set of patterns 1610 also includes one or more patterns formed through parameter variation 1604. The set of patterns 1610 also includes previously stored patterns 1606. The set of patterns 1610 also includes user specified patterns 1608.

In various embodiments, the control circuit selects a second valve actuation pattern from amongst a set of preconfigured valve actuation patterns. In various embodiments, the control circuit selects a second valve actuation pattern based on factors including temporal factors. In various embodiments, the control circuit selects a second valve actuation pattern based on a pattern matching algorithm. In various embodiments, the control circuit can be configured to generate new valve actuation patterns by modifying parameters of existing valve actuation patterns. In various embodiments, the control circuit can be configured to store generated valve actuation patterns as a part of a set of preconfigured valve actuation patterns. In various embodiments, the control circuit receives the second valve actuation pattern from a remote site. In various embodiments, the filtration system receives one or more valve actuation patterns from a remote site.

The number of patterns within the set of patterns can vary. In some embodiments, the number of patterns can be greater than or equal to 1, 2, 5, 10, 15, 20, 25, 30, 35, 40, 45, 50, 55, 60, 65, 70, 75, 80, 85, 90, 95, or 100 patterns, or can be an amount falling within a range between any of the foregoing.

Figure 17:
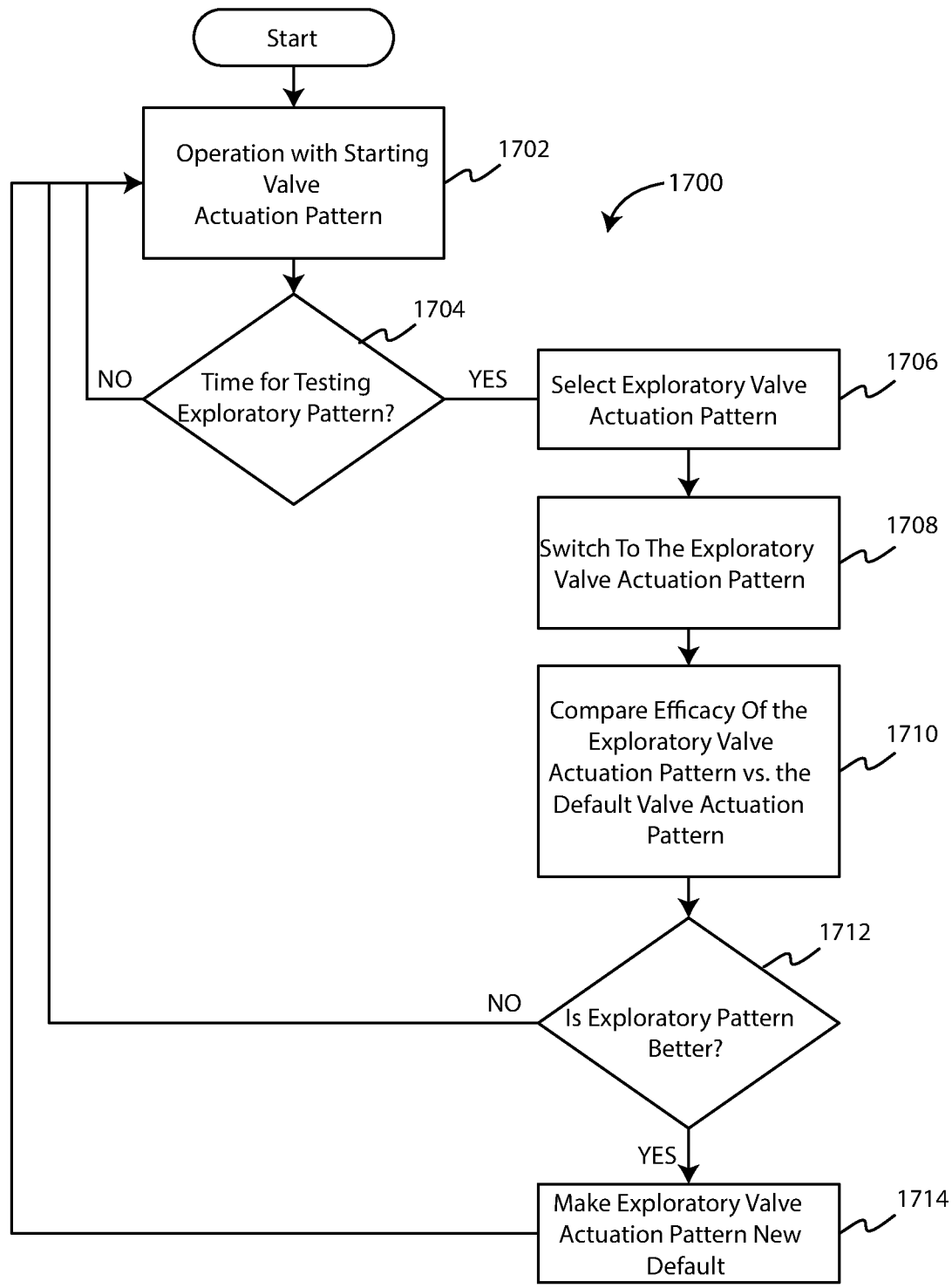
FIG. 17 is a flowchart of some operations performed in accordance with various embodiments herein.

Referring now to FIG. 17, a flowchart of some operations 1700 performed by the system is shown in accordance with various embodiments herein. The operations 1700 include initial operation with a default valve actuation pattern 1702. The operations 1700 can also include evaluating whether it is time for testing an exploratory valve actuation pattern 1704. The operations 1700 can also include selecting an exploratory valve actuation pattern 1706. The operations 1700 also include switching to the exploratory valve actuation pattern 1708. The operations 1700 can also include comparing the efficacy of the exploratory valve actuation pattern versus the default valve actuation pattern 1710. The operations 1700 can also include evaluating whether the exploratory pattern is better 1712. The operations 1700 also include making the exploratory valve actuation pattern the new default actuation pattern 1714.

Figure 18:
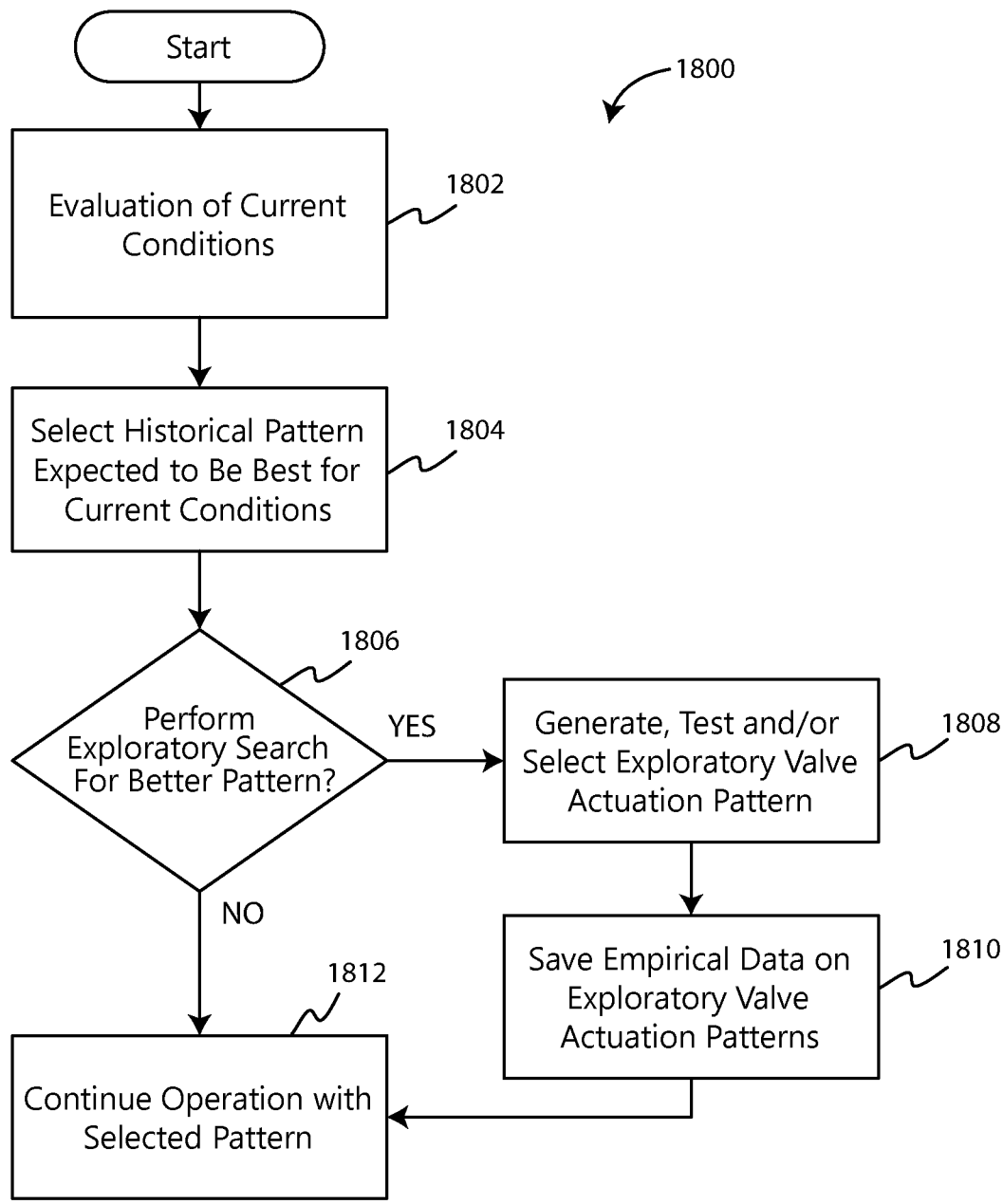
FIG. 18 is a flowchart of some operations performed in accordance with various embodiments herein.

Referring now to FIG. 18, a flowchart of some operations 1800 performed by the system is shown in accordance with various embodiments herein. The operations 1800 include evaluation of current conditions 1802. The operations 1800 can also include selecting 1804 a historical pattern expected to be best for current conditions. Selection can be performed in various ways such as that described elsewhere herein. The operations 1800 can also include an exploratory search for a better pattern 1806. If an exploratory search is performed, then the system can perform operations including one or more of generating, testing, and selecting an exploratory valve actuation pattern. In such a scenario, empirical data regarding the efficacy of the exploratory valve can be saved 1810 in another operation. Then operation can be continued with a selected pattern 1812. Else, if an exploratory search is not performed then operation can also be continued with a selected pattern 1812.

Methods

Many different methods are contemplated herein, including, but not limited to, methods of making, methods of using, and the like. Aspects of system/device operation described elsewhere herein can be performed as operations of one or more methods in accordance with various embodiments herein.

In an embodiment, a method of operating a filtration system is included, the method including sensing data including at least one of temperature, humidity, and particulate types entering the filtration system, selecting a valve actuation pattern, the valve actuation pattern can include a sequence of valves to be opened, and opening valves from amongst a plurality of valves according to the determined valve actuation pattern.

In an embodiment, the method can include selecting the valve actuation pattern includes selecting the valve actuation pattern from a set of predetermined valve actuation patterns.

In an embodiment of the method at least some valve actuation patterns in the set of predetermined valve actuation patterns are received from a remote source.

In an embodiment of the method, at least some valve actuation patterns in the set of predetermined valve actuation patterns are generated by a recombination of valve actuation parameters.

In an embodiment of the method, selecting the valve actuation pattern includes selecting the valve actuation pattern based on a set of criteria including current weather conditions.

In an embodiment of the method, selecting the valve actuation pattern includes selecting the valve actuation pattern based on a set of criteria including current temperature and humidity.

In an embodiment of the method, selecting the valve actuation pattern includes selecting the valve actuation pattern based on a set of criteria including data regarding particulates flowing into the filtration system.

In an embodiment, the method can further include periodically switching to an exploratory valve actuation pattern and comparing an efficacy of the selected valve actuation pattern and an efficacy of the exploratory valve actuation pattern.

In an embodiment, the method can further include continuing use of the exploratory valve actuation pattern if its efficacy is higher than the selected valve actuation pattern.

In an embodiment of the method, the recombination is randomly generated. In an embodiment of the method, the recombination is generated using a machine learning algorithm.

Pattern Selection

In accordance with various embodiments herein, the system can select a valve actuation pattern. Further details about valve actuation pattern selection are provided as follows. However, it will be appreciated that this is merely provided by way of example and that further variations are contemplated herein.

In various embodiments, the control circuit can select a valve actuation pattern (such as for a second mode of operation) from amongst a set of predetermined valve actuation patterns. In various embodiments, the control circuit can select a valve actuation pattern based on factors including temporal factors. In various embodiments, the control circuit can select a valve actuation pattern based on a pattern matching algorithm (such as that described above). In various embodiments, the control circuit can select a valve actuation patterns by modifying parameters of existing valve actuation patterns.

In various embodiments, the control circuit can select a valve actuation pattern from amongst a set of preconfigured valve actuation patterns. In various embodiments, the control circuit can select a valve actuation pattern based on what it receives from a remote site.

In various embodiments, the filtration system receives one or more valve actuation patterns from a remote site, and then selects from the received valve actuation patterns.

In various embodiments, the control circuit is configured to select a valve actuation pattern based on a set of criteria including current and/or predicted weather and environmental conditions. In various embodiments, current and/or predicted weather and environmental conditions include snowstorms, sandstorms, pollen loads, and plant debris. In various embodiments, the control circuit is configured to select a valve actuation pattern based on current or anticipated icing conditions. In various embodiments, the control circuit is configured to select a valve actuation pattern based on a set of criteria including current temperature and humidity.

In various embodiments, the control circuit is configured to select a valve actuation pattern based on a set of criteria including data regarding particulates flowing into the filtration system. In various embodiments, the data regarding particulates flowing into the filtration system is sensor-based, sampling based, or user-input based.

Pulse Jet Air Cleaner Operation

In various embodiments, filtration systems herein can include an air manifold connected to a compressed air supply. Attached to the manifold are diaphragm valves (or other valves) that may have tubes (blowpipes) that are lined up with each filter element or filter element set. Inside each diaphragm valve is a rubber diaphragm that holds equal pressure on both sides of the diaphragm valve sealing the manifold from each blowpipe. A solenoid enclosure can be included with generally the same number of solenoid valves as there are diaphragm valves. A tube connects each solenoid valve to a diaphragm valve. The solenoid valve plunger assembly allows air to escape through an outlet port when energized, allowing air to bleed off the back of the diaphragm valve. This action allows compressed air from the manifold to enter the blowpipe directing the air into the filter elements to facilitate cleaning. This pulse of compressed air typically has a duration from 80 to 120 milliseconds that cleans the filters from the inside, knocking the particulates off the outside surface of the filter element. While this is one specific example of how pulse cleaning can be performed, it will be appreciated that there are other approaches to pulse cleaning contemplated herein and the scope herein is not particularly limited.

In some embodiments, the pulse jet air cleaners can follow a valve actuation pattern from the top to the bottom of the chamber to eventually direct the dust particulate material blown from the filters into the lower hopper, for removal. In many air pulse jet cleaning applications, a useful air pressure is generally within the range of 60 to 1500 psi. In some embodiments stream of liquid, such as water, soaps, degreasers, and solvents of any kind can also dislodge particulate from the PTFE layer alone or in conjunction with the reverse air. In many liquid jet applications, a useful liquid pressure is generally within the range of 0 to 120 psi.

The properties of filter element can be such that captured particulate matter will not easily adhere to the filter element in typical applications. By locating a PTFE layer on the upstream side of the filter element, the layer can be easily accessible for cleaning. The cleaning of the PTFE layer can therefore be readily accomplished by various means such as air pulse cleaning or upstream washing with liquid or air. As a result, the useful service life of the filter medium can be significantly increased when the PTFE layer is located on the upstream side of the filter medium. Further, because a PTFE layer can be applied to virtually any size and style of filter medium, retrofit installations in existing systems can be readily accomplished without the need for extensive equipment modification. Thus, a gas turbine owner or operator can economically obtain a filter that has both a higher efficiency and better moisture removal characteristics than most typical filters.

Operational Parameters

Valve actuation patterns herein include variation of operational parameters. Further details about some exemplary operational parameters are provided as follows. However, it will be appreciated that this is merely provided by way of example and that further variations are contemplated herein.

In various embodiments, the operational parameters can include at least one of a horizontal actuation sequence, a vertical actuation sequence, a zone actuation sequence, a group actuation sequence, a valve opening time, a degree of valve opening, an air pressure, a delay factor or an amount of time between sequential valve actuations, and a threshold pressure drop for triggering valve actuation.

Exemplary delay factors, wherein included, can be on the order of milliseconds, seconds, minutes, or longer. Exemplary delay factors (when measured as an absolute amount of time instead of factor relative to a baseline amount) can be about 5, 10, 30, 50, 100, 200, 300, 500, or 750 milliseconds, or about 1, 2, 3, 4, 5, 10, 15, 30, or 45 seconds, or about 1, 2, 3, 4, 5, 10, 15, 20, or 30 minutes or more, or an amount of time falling within a range between any of the foregoing. Exemplary delay factors (when measured as a multiple relative to a baseline amount) can be about 0.1, 0.3, 0.5, 0.75, 1, 1.5, 2, 2.5, 3, 3.5, 4, 5, 7.5, 10, 15, 20, or 30 or more, or an amount falling within a range between any of the foregoing.

Exemplary valve opening times can be about 30, 40, 50, 60, 70, 80, 90, 100, 120, 130, 150, 175, 200, 250, 300, 400, or 500 milliseconds, or longer, or an amount falling within a range between any of the foregoing.

Exemplary air pressures can be about 50, 60, 75, 100, 150, 200, 300, 400, 500, 750, 1000, 1250, or 1500 psi or more, or an amount falling within a range between any of the foregoing.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A filtration system comprising:
    a plurality of filter element mounts, wherein the plurality of filter element mounts are configured to retain filter elements;
    a compressed gas supply;
    a plurality of valves, wherein the plurality of valves are in fluid communication with the compressed gas supply; and
    a control circuit;
    wherein the control circuit is configured to
        control actuation of the plurality of valves;
        operate in a first mode, wherein operating in a first mode includes opening valves according to a first valve actuation pattern;
        operate in a second mode, wherein operating in the second mode includes opening valves according to a second valve actuation pattern; and
        periodically switch from the first mode to the second mode and compare the efficacy of the two modes; and
        generate new valve actuation patterns by modifying parameters of existing valve actuation patterns.

2. The filtration system of claim 1, wherein the first mode represents a default operating mode.

3. The filtration system of claim 1, wherein the control circuit selects the second valve actuation pattern of the second mode from amongst a set of preconfigured valve actuation patterns.

4. The filtration system of claim 1, wherein the control circuit selects the second valve actuation pattern of the second mode based on factors including temporal factors.

5. The filtration system of claim 1, wherein the control circuit selects the second valve actuation pattern of the second mode based on a pattern matching algorithm.

6. The filtration system of claim 1, wherein the control circuit is configured to store generated valve actuation patterns as a part of a set of preconfigured valve actuation patterns.

7. The filtration system of claim 1, wherein the filtration system receives one or more valve actuation patterns from a remote site.

8. The filtration system of claim 1, wherein the efficacy is assessed based on a magnitude of a change in pressure drop in the filtration system achieved resulting from execution of a valve actuation pattern.

9. The filtration system of claim 1, wherein the efficacy is assessed based on a magnitude of pressure drop recovery in the filtration system achieved resulting from execution of a valve actuation pattern.

10. The filtration system of claim 1, wherein the efficacy is assessed based on a magnitude of sustained pressure drop recovery in the filtration system achieved resulting from execution of a valve actuation pattern.

11. The filtration system of claim 1, wherein the efficacy is assessed based on a magnitude of a change in velocity across a filter element achieved resulting from execution of a valve actuation pattern.

12. The filtration system of claim 1, wherein the control circuit adopts the second mode as a new default mode if the efficacy of the second mode is better than the efficacy of the first mode.

13. The filtration system of claim 1, wherein the second valve actuation pattern is different than the first valve actuation pattern in at least one operational parameter, wherein the operational parameters are selected from the group consisting of a horizontal actuation sequence, a vertical actuation sequence, a zone actuation sequence, a linked group actuation sequence, a valve opening time, an amount of time between sequential valve actuations, and a threshold pressure drop for triggering valve actuation.

14. The filtration system of claim 1, wherein the control circuit is configured to trigger actuation of at least one other treatment in combination with valve actuation patterns, wherein the other treatments include sonic excitation.

15. The filtration system of claim 1, wherein the control circuit is configured to select a valve actuation pattern based on a set of criteria including current temperature and humidity.

16. A filtration system comprising:
    a plurality of filter element mounts, wherein the plurality of filter element mounts are configured to retain filter elements;
    a compressed gas supply;
    a plurality of valves, wherein the plurality of valves are in fluid communication with the compressed gas supply; and
    a control circuit;

wherein opening the plurality of valves results in a pulse of a gas directed at the filter element;
wherein the control circuit is configured to
control actuation of the plurality of valves;
receive a set of predetermined valve actuation patterns from a remote site;
select a valve actuation pattern from the set of predetermined valve actuation patterns and execute the same such that valves are actuated in a sequence according to the predetermined valve actuation pattern.

17. The filtration system of claim 16, wherein the control circuit is configured to select a valve actuation pattern based on a set of criteria including current weather and environmental conditions, wherein current weather and environmental conditions include snowstorms, sandstorms, pollen loads, and plant debris.

18. The filtration system of claim 16, wherein the control circuit is configured to select a valve actuation pattern based on a set of criteria including data regarding particulates flowing into the filtration system.

19. A filtration system comprising:
a plurality of filter element mounts, wherein the plurality of filter element mounts are configured to retain filter elements;
a compressed gas supply;
a plurality of valves, wherein the plurality of valves are in fluid communication with the compressed gas supply; and
a control circuit;
wherein the control circuit is configured to
control actuation of the plurality of valves;
operate in a first mode, wherein operating in a first mode includes opening valves according to a first valve actuation pattern;
operate in a second mode, wherein operating in the second mode includes opening valves according to a second valve actuation pattern; and
periodically switch from the first mode to the second mode and compare the efficacy of the two modes; and
store generated valve actuation patterns as part of a set of preconfigured valve actuation patterns.

* * * * *